United States Patent
Li et al.

(10) Patent No.: US 12,249,901 B2
(45) Date of Patent: Mar. 11, 2025

(54) ADAPTIVE SWITCH DRIVING

(71) Applicant: Qualcomm Incorporated, San Diego, CA (US)

(72) Inventors: Kan Li, Singapore (SG); Guolei Yu, Singapore (SG); Hua Guan, San Diego, CA (US); Todd Robert Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/324,694

(22) Filed: May 26, 2023

(65) Prior Publication Data
US 2023/0299655 A1   Sep. 21, 2023

Related U.S. Application Data

(63) Continuation of application No. 17/307,904, filed on May 4, 2021, now Pat. No. 11,664,716.

(60) Provisional application No. 63/027,291, filed on May 19, 2020.

(51) Int. Cl.
*H02M 1/08* (2006.01)
*H02M 1/00* (2006.01)
*H02M 3/158* (2006.01)
*H02M 1/38* (2007.01)

(52) U.S. Cl.
CPC ......... *H02M 1/0029* (2021.05); *H02M 3/158* (2013.01); *H02M 1/08* (2013.01); *H02M 1/385* (2021.05)

(58) Field of Classification Search
CPC ...... H02M 1/0029; H02M 1/08; H02M 1/385; H02M 1/0022; H02M 1/0032; H02M 3/156–158; H02M 1/38
See application file for complete search history.

(56) References Cited

U.S. PATENT DOCUMENTS

| | | | |
|---|---|---|---|
| 8,305,053 B2 | 11/2012 | Truong et al. | |
| 9,106,134 B2 | 8/2015 | Guo et al. | |
| 9,798,348 B2 | 10/2017 | Mohr et al. | |
| 10,756,725 B2 * | 8/2020 | Jordanger | H03K 17/166 |
| 11,664,716 B2 | 5/2023 | Li et al. | |
| 2011/0018515 A1 * | 1/2011 | McCloy-Stevens | H02M 3/1588 323/284 |
| 2013/0336011 A1 | 12/2013 | Broussev et al. | |
| 2014/0139160 A1 | 5/2014 | Hattori | |
| 2019/0222121 A1 | 7/2019 | Hallikainen | |
| 2020/0136509 A1 * | 4/2020 | Ou | H02M 3/158 |

(Continued)

*Primary Examiner* — Alex Torres-Rivera
(74) *Attorney, Agent, or Firm* — Colby Nipper

(57) ABSTRACT

An apparatus is disclosed for adaptive switch driving. In an example aspect, the apparatus includes a switching circuit configured to selectively be in a first state that provides an input voltage as an output voltage, be in a second state that provides a ground voltage as the output voltage, or be in a third state that causes the output voltage to change from the input voltage to the ground voltage according to a slew rate. The third state enables the switching circuit to transition from the first state to the second state. The switching circuit is also configured to adjust the slew rate of the output voltage for the third state responsive to at least one of the following: a change in a magnitude of a direct-current supply voltage or a change in a magnitude of an input current.

30 Claims, 12 Drawing Sheets

(56) References Cited

U.S. PATENT DOCUMENTS

2020/0304034 A1    9/2020   Namekawa
2020/0403509 A1   12/2020  Zhang et al.

\* cited by examiner

ADAPTIVE SWITCH DRIVING

CROSS-REFERENCE TO RELATED APPLICATION(S)

This application is a continuation application of U.S. application Ser. No. 17/307,904, filed 4 May 2021, which in turn claims priority to U.S. Provisional Application Ser. No. 63/027,291, filed 19 May 2020, the disclosures of which are incorporated herein by reference in their entireties.

TECHNICAL FIELD

This disclosure relates generally to switch-mode power supplies and, more specifically, to driving a switch of a switch-mode power supply.

BACKGROUND

A switch-mode power supply (SMPS) uses switches to transfer power between a power source and a load. Large input currents or large DC supply voltages can stress the switch-mode power supply during operation. In some cases, this stress can lead to switch degradation and premature failure of the power supply.

SUMMARY

An apparatus is disclosed that implements adaptive switch driving. In particular, the apparatus includes a switching circuit with at least one switch that interrupts the flow of an input current. The switching circuit also includes a driver circuit and a driver controller. The driver circuit provides a driver current to charge or discharge an intrinsic capacitor of the switch and control a transition period of the switch. The driver controller indirectly or directly monitors one or more parameters that affect a voltage at a terminal of the switch. These parameters can include an input current and/or a direct-current (DC) supply voltage. The driver controller adjusts the magnitude of the driver current responsive to detecting a change in one or more of these parameters.

For example, if one or more of these parameters decreases, a likelihood of the peak voltage exceeding a breakdown voltage of the switch decreases. Therefore, the driver controller can increase the driver current to decrease the transition period of the switch and improve efficiency. Alternatively, if one or more of these parameters increases, there is a higher likelihood that the peak voltage can exceed the breakdown voltage of the switch. In response, the driver circuit can increase the transition period of the switch to reduce the peak voltage and improve reliability. In these ways, the driver circuit can readily adapt to balance reliability and efficiency in various situations.

In an example aspect, an apparatus is disclosed. The apparatus includes a switching circuit including an input and an output. The input is configured to accept an input voltage and an input current. The input voltage includes a direct-current supply voltage. The output is configured to provide an output voltage. The switching circuit is configured to selectively be in a first state that provides the input voltage as the output voltage, be in a second state that provides a ground voltage as the output voltage, or be in a third state that causes the output voltage to change from the input voltage to the ground voltage according to a slew rate. The third state enables the switching circuit to transition from the first state to the second state. The switching circuit is also configured to adjust the slew rate of the output voltage for the third state responsive to at least one of the following: a change in a magnitude of the direct-current supply voltage or a change in a magnitude of the input current.

In an example aspect, an apparatus is disclosed. The apparatus includes switch-mode means for transferring power between a power source and a load. The switch-mode means includes switching means for selectively operating in a closed state to connect the power source to the load or an open state to disconnect the power source from the load. The switch-mode means also includes driver means for controlling a transition period associated with the switching means transitioning from the closed state to the open state. The switch-mode means additionally includes monitor means for detecting a change in a magnitude of an input current or a change in a magnitude of a direct-current supply voltage provided by the power source. The switch-mode means further includes control means for adjusting the transition period responsive to the monitor means detecting the change in the magnitude of the input current or the change in the magnitude of the direct-current supply voltage.

In an example aspect, a method for adaptive switch driving is disclosed. The method includes accepting an input voltage and an input current at an input of a switching circuit. The input voltage includes a direct-current supply voltage. The method also includes operating the switching circuit in a first state to provide the input voltage as an output voltage at an output of the switching circuit. The method additionally includes operating the switching circuit in a second state to provide a ground voltage as the output voltage at the output. The method further includes operating the switching circuit in a third state to transition from the first state to the second state. The third state causes the output voltage to change from the input voltage to the ground voltage according to a slew rate. The method also includes adjusting the slew rate of the output voltage responsive to at least one of the following: a change in a magnitude of the direct-current supply voltage or a change in a magnitude of the input current.

In an example aspect, an apparatus is disclosed. The apparatus includes a switching circuit with an input, at least one switch, at least one driver circuit, and at least one driver controller. The input is configured to accept an input voltage. The at least one switch is coupled between the input and an output of the switching circuit. The at least one switch is configured to selectively be in a closed state to connect the input to the output or be in an open state to disconnect the input from the output. The at least one driver circuit is coupled to the at least one switch. The at least one driver circuit is configured to provide a driver current to enable the at least one switch to transition from the closed state to the open state. The at least one driver controller is coupled to the at least one driver circuit and configured to monitor at least one parameter associated with the input voltage. The at least one driver controller is also configured to detect a change in the at least one parameter and adjust a magnitude of the driver current provided by the at least one driver circuit based on the detected change in the at least one parameter.

BRIEF DESCRIPTION OF DRAWINGS

FIG. 3-1 illustrates an example switching circuit for adaptive switch driving.

FIG. 3-2 illustrates example states of a switching circuit for adaptive switch driving.

FIG. 3-3 illustrates changes in an output voltage of a switching circuit for different modes associated with adaptive switch driving.

FIG. 3-4 illustrates another example state of a switching circuit for adaptive switch driving.

FIG. 4 illustrates an example driver controller for adaptive switch driving.

FIG. 5-1 illustrates a first example implementation of a driver controller for adaptive switch driving.

FIG. 5-2 illustrates a second example implementation of a driver controller for adaptive switch driving.

FIG. 5-3 illustrates a third example implementation of a driver controller for adaptive switch driving.

FIG. 5-4 illustrates a fourth example implementation of a driver controller for adaptive switch driving.

DETAILED DESCRIPTION

Figure 1:
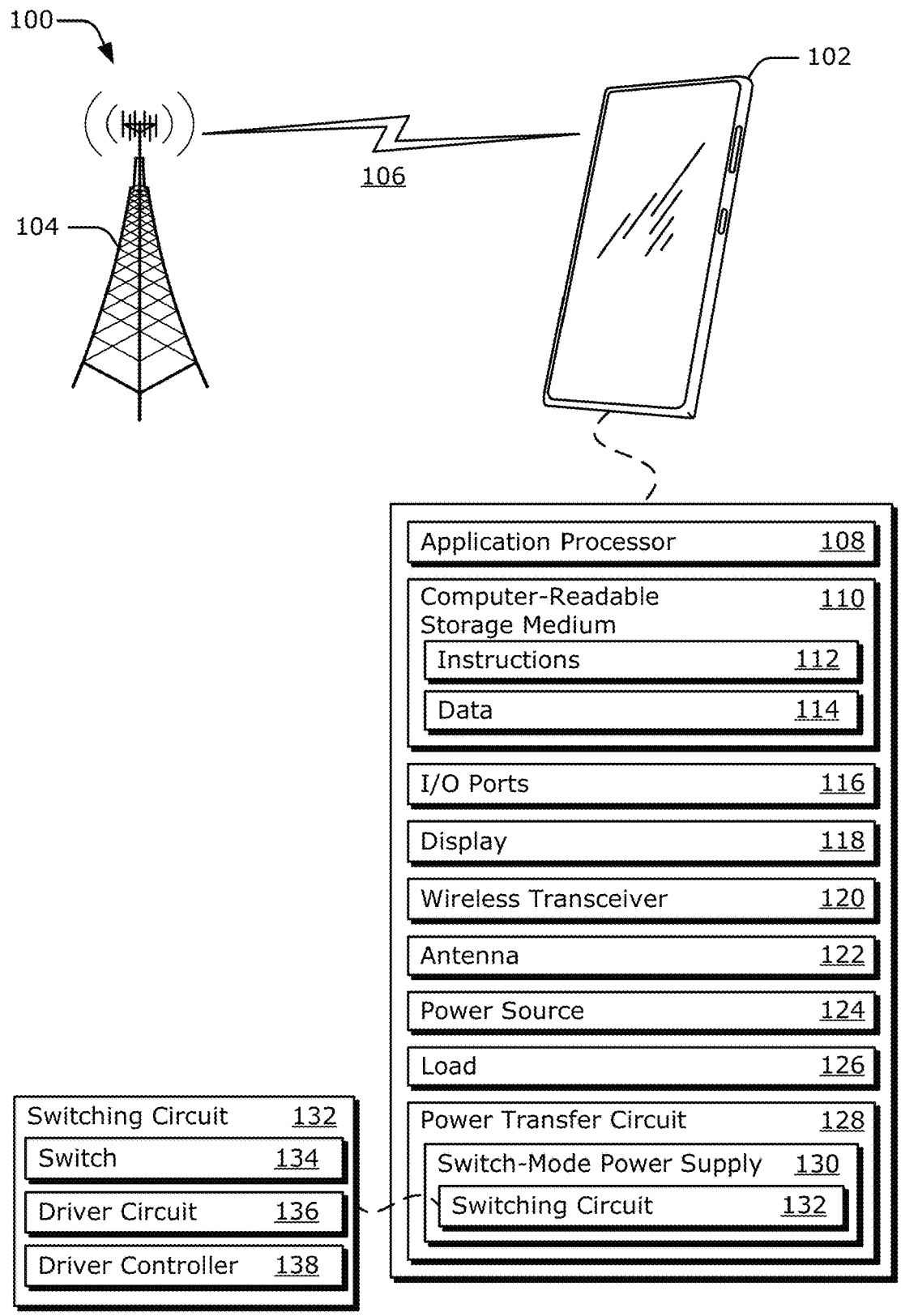
FIG. 1 illustrates an example operating environment for adaptive switch driving.

A switch-mode power supply uses switches to transfer power between a power source and a load. At least one of the switches within the switch-mode power supply can control the flow of current from the power source to the load. Parasitic and non-parasitic inductors within the switch-mode power supply and package, however, resist the change in current flow. Consequently, these inductors can cause voltage ringing at one or more terminals of the switch in response to the switch opening to interrupt the flow of current. In some situations, a peak voltage caused by the voltage ringing can exceed a breakdown voltage of the switch. Left unchecked, the reliability of the switch can degrade over time due to this peak voltage.

This problem can be exacerbated in some operating conditions or implementations. For example, larger currents or larger direct-current supply voltages supplied by the power source can increase the peak voltage observed by the switch. As another example, some types of interconnections and packaging can increase the amount of parasitic inductance seen by the switch, which can increase the peak voltage caused by the voltage ringing.

To reduce the peak voltage, some techniques add a capacitor or a clamp circuit at the input node of the switch-mode power supply to dampen the voltage ringing. Other techniques can apply routing or printed-circuit-board (PCB) layout constraints to reduce the parasitic inductance seen by the switch and therefore decrease the peak voltage. Still other techniques can sacrifice efficiency for reliability by permanently operating the switch with a longer switching period to decrease the peak voltage.

In contrast, techniques for adaptive switch driving are described herein. An apparatus includes a switching circuit with at least one switch that interrupts the flow of an input current. The switching circuit also includes a driver circuit and a driver controller. The driver circuit provides a driver current to charge or discharge an intrinsic capacitor of the switch and control a transition period of the switch. The driver controller indirectly or directly monitors one or more parameters that affect a voltage at a terminal of the switch. These parameters can include an input current and/or a direct-current (DC) supply voltage. The driver controller adjusts the magnitude of the driver current responsive to detecting a change in one or more of these parameters.

For example, if one or more of these parameters decreases, a likelihood of the peak voltage exceeding a breakdown voltage of the switch decreases. Therefore, the driver controller can increase the driver current to decrease the transition period of the switch and improve efficiency. Alternatively, if one or more of these parameters increases, there is a higher likelihood that the peak voltage can exceed the breakdown voltage of the switch. In response, the driver circuit can increase the transition period of the switch to reduce the peak voltage and improve reliability. In these ways, the driver circuit can readily adapt to balance reliability and efficiency in various situations.

FIG. 1 illustrates an example environment 100 for adaptive switch driving. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, a mesh network node, a fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi™); IEEE 802.15 (e.g., Bluetooth™); IEEE 802.16 (e.g., WiMAX™); and so forth. In some implementations, the wireless link 106 may wirelessly provide power and the base station 104 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented.

A wireless transceiver 120 of the computing device 102 provides connectivity to respective networks and other electronic devices connected therewith. Alternatively or additionally, the computing device 102 can include a wired transceiver, such as an Ethernet or fiber optic interface for communicating over a local network, intranet, or the Internet. The wireless transceiver 120 can facilitate communication over any suitable type of wireless network, such as a wireless local area network (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 122. Components of the wireless transceiver 120 can include amplifiers, switches, mixers, analog-to-digital converters, filters, and so forth for conditioning the communication signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122.

The computing device 102 also includes at least one power source 124, at least one load 126, and at least one power transfer circuit 128. The power source 124 can represent a variety of different types of power sources, including a wired power source, a solar charger, a portable charging station, a wireless charger, a battery, and so forth. In general, the power source 124 can be an internal power source that is internal to the computing device 102 or an external power source that is external from the computing device 102. Depending on the type of computing device 102, the battery may comprise a lithium-ion battery, a lithium polymer battery, a nickel-metal hydride battery, a nickel-cadmium battery, a lead acid battery, and so forth. In some cases, the battery can include multiple batteries, such as a main battery and a supplemental battery, and/or multiple battery cell combinations.

The power transfer circuit 128 transfers power from the power source 124 to one or more loads 126 of the computing device 102. Generally, the power level provided via the power transfer circuit 128 and the power source 124 is at a level sufficient to power the one or more loads 126. For example, the power level may be on the order of milliwatts (mW) for powering loads associated with a smartphone, or on the order of watts to kilowatts (kW) for powering loads associated with an electric vehicle. Example types of loads include a variable load, a load associated with a component of the computing device 102 (e.g., the application processor 108, an amplifier within the wireless transceiver 120, the display 118, a battery, or a power converter), a load that is external from the computing device 102 (e.g., another battery), and so forth. The power transfer circuit 128 can be a stand-alone component or integrated within another component, such as a power management integrated circuit (PMIC) (not shown).

The power transfer circuit 128 includes at least one switch-mode power supply 130, which can be implemented as a buck power converter, a buck-boost power converter, and so forth. The switch-mode power supply 130 includes at least one switching circuit 132 to enable DC-to-DC power conversion. The switching circuit 132 includes at least one switch 134, at least one driver circuit 136, and at least one driver controller 138. In addition to the switching circuit 132, the switch-mode power supply 130 can include other energy storage components, including at least one inductor or at least one capacitor.

The switch 134 can interrupt an input current that is provided from the power source 124 to the switch-mode power supply 130 by transitioning from a closed state to an open state. The switch 134 can be implemented using a transistor, such as a metal-oxide-semiconductor field-effect transistor (MOSFET) (e.g., n-type MOSFET or p-type MOSFET), a junction field-effect transistor (JFET), a bipolar junction transistor (BJT), an insulated gate bipolar transistor (IGBT), and so forth. The switch 134 includes an intrinsic capacitor, which prevents the switch 134 from instantaneously switching between the closed state and the open state. In particular, the intrinsic capacitor, such as a gate capacitor associated with a MOSFET, resists a change in voltage at a gate terminal of the switch 134.

The driver circuit 136 is coupled to the switch 134 and enables the switch 134 to transition between the closed state and the open state. In particular, the driver circuit 136 provides a driver current to assist with charging or discharging the intrinsic capacitor of the switch 134. The rate at which the switch 134 transitions between states is dependent upon the rate at which the intrinsic capacitor is charged or discharged by the driver current. As such, increasing the driver current increases the transition rate (e.g., decreases the transition period of the switch 134), and decreasing the driver current decreases the transition rate (e.g., increases the transition period of the switch 134).

The driver controller 138 is coupled to the driver circuit 136 and can at least partially implement adaptive switch driving. The driver controller 138 indirectly or directly monitors one or more parameters that can affect a voltage at a terminal of the switch 134 and adjusts the magnitude of the driver current based on these parameters. In particular, the driver controller 138 adapts the driver current and therefore the switch 134's transition rate to balance reliability with efficiency. For example, the driver controller can increase the transition rate to improve efficiency of the switch 134 or decrease the transition rate to reduce a peak voltage at the terminal of the switch and protect the switch 134 from voltage ringing. Through adaptive switch driving, the switching circuit 132 is able to appropriately configure itself to enhance a balancing of reliability versus efficiency in different operating conditions.

In some implementations, the switching circuit 132 is implemented within an integrated circuit. In the depicted configuration, the switching circuit 132 is integrated within the switch-mode power supply 130. In other implementations, the switching circuit 132 (or a portion of the switching circuit 132 such as the driver controller 138) can be external to the switch-mode power supply 130. For example, the driver controller 138 can be implemented by the PMIC, the application processor 108, a main processor, a secondary processor, or a low-power digital signal processor (DSP) of the computing device 102.

Although not shown, the power transfer circuit 128 can include other types of control circuitry (not shown) that controls operation of the switch-mode power supply 130. For example, this control circuitry can monitor operation of the switch-mode power supply 130 and control the pulse-width modulation of the switching circuit 132. An example switch-mode power supply 130 is further described with respect to FIG. 2.

Figure 2:
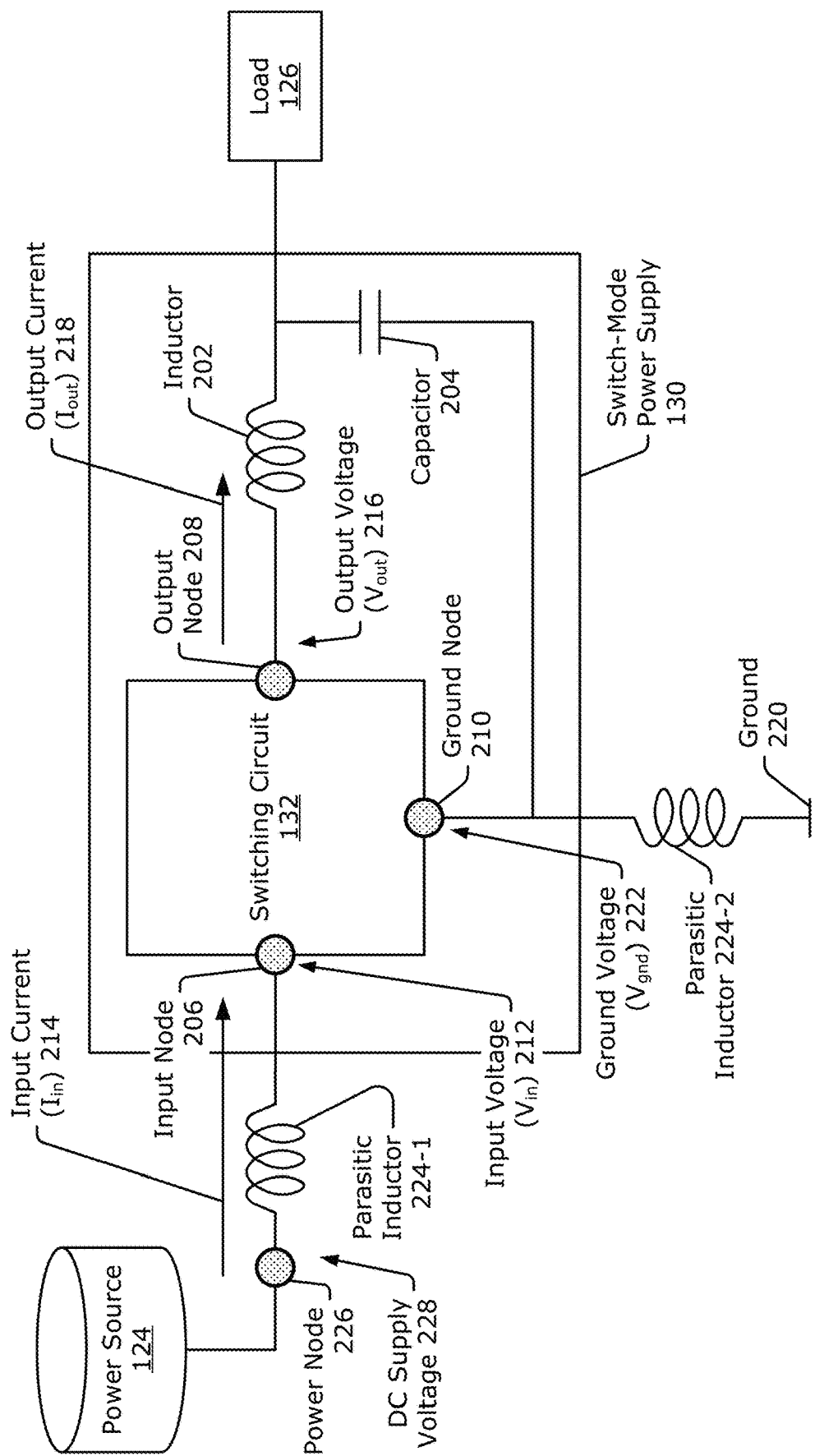
FIG. 2 illustrates an example switch-mode power supply, an example power source, and an example load for adaptive switch driving.

FIG. 2 illustrates an example switch-mode power supply 130, an example power source 124, and an example load 126 for adaptive switch driving. The switch-mode power supply 130 is coupled between the power source 124 and the load 126. In the depicted configuration, the switch-mode power supply 130 is implemented as a buck converter, and includes the switching circuit 132, at least one inductor 202, and at least one capacitor 204.

The switching circuit 132 includes an input (e.g., an input node 206), an output (e.g., an output node 208), and a ground node 210. The input node 206 is coupled to the power source 124 and accepts both an input voltage ($V_{in}$) 212 and an input current ($I_{in}$) 214 from the power source 124. The output node 208 is coupled to the inductor 202 and provides an output voltage ($V_{out}$) 216 and an output current ($I_{out}$) 218. The ground node 210 is coupled to a ground 220 and accepts a ground voltage 222 (e.g., a reference voltage associated with the ground 220). The inductor 202 is coupled between the output node 208 and the load 126. The capacitor 204 is coupled between the load and the ground 220 (e.g., the ground node 210).

The switch-mode power supply 130 is implemented on a package or printed circuit board (PCB). Parasitic inductances resulting from interconnections (e.g., routing) and layout of the package or printed circuit board are seen by the switching circuit 132. These parasitic inductances are represented by a first parasitic inductor 224-1, which exists between a power node 226 associated with the power source 124 and the input node 206, and a second parasitic inductor 224-2, which exists between the ground node 210 and the ground 220. As an example, inductances of the parasitic inductances 224-1 and 224-2 can each be on the order of 1 or 2 nanohenries (nH).

The parasitic inductors 224-1 and 224-2 and the inductor 202 oppose changes in current. If the current changes through any of the inductors 224-1, 224-2, or 202, an opposing voltage is induced within the affected inductor, which prevents the current from changing instantaneously. The induced voltage is proportional to the rate at which the current changes and the inductance (e.g., self-inductance) of the inductor, as shown by Equation 1 below:

$$V = L\frac{di}{dt} \qquad \text{Equation 1}$$

where V represents the inducted voltage in volts, L represents the inductance of the inductor in henries, and di/dt represents the rate of change of the current in amperes per second. A polarity of the induced voltage opposes the change in the current.

During operation, the switching circuit 132 selectively passes the input current 214 from the input node 206 to the output node 208 or interrupts (e.g., prevents or stops) the flow of the input current 214 from the input node 206 to the output node 208. For example, in a first state, the switching circuit 132 connects the input node 206 to the output node 208 and disconnects the ground node 210 from the output node 208. As such, the switching circuit 132 provides the input voltage 212 as the output voltage 216 and provides the input current 214 as the output current 218 to charge the inductor 202. The output current 218 enables the inductor 202 to increase the amount of energy stored by its magnetic field.

In a second state, the switching circuit 132 disconnects the input node 206 from the output node 208 and connects the ground node 210 to the output node 208. This effectively disconnects the power source 124 from the load 126. The switching circuit 132 provides the ground voltage 222 as the output voltage 216 and the inductor 202 operates as a current source to provide the output current 218 to the load 126. The output current 218 generated by the inductor 202 discharges the inductor (e.g., decreases the amount of energy stored by the magnetic field).

Due to intrinsic capacitors, the switching circuit 132 is unable to instantaneously transition between the first state and the second state. As such, the switching circuit 132 can be in a third state (e.g., a transition state) while transitioning from the first state to the second state. A duration of time that the switching circuit 132 operates in the third state is referred to as a transition period.

In the third state, the switching circuit 132 decreases the flow of the input current 214 from the input node 206 to the output node 208 and increases the flow of a current from the ground node 210 to the output node 208. This causes the parasitic inductor 224-1 to resist the change to the input current 214, the inductor 202 to resist the change to the output current 218, and the parasitic inductor 224-2 to resist the change in current from the ground 220 to the ground node 210. This opposition causes voltage ringing to occur at the input node 206, the output node 208, and the ground node 210. In some cases, the voltage ringing can have a peak voltage that reduces reliability of the switching circuit 132 and damages one or more switches 134 within the switching circuit 132.

Consider the input voltage 212 at the input node 206. While the switching circuit 132 operates in the third state, the voltage ringing caused by the parasitic inductor 224-1 can affect a peak of the input voltage 212, as represented by Equation 2 below:

$$V_{in\_peak} = L\frac{di}{dt} + V_{DC} \qquad \text{Equation 2}$$

wherein $V_{in\_peak}$ represents a peak of the input voltage 212, L represents the inductance of the parasitic inductor 224-1, di represents the change in the input current 214 due to the switching circuit 132 interrupting the flow of the input current 214, dt represents the transition period of the switching circuit 132, and $V_{DC}$ represents a direct current (DC) supply voltage 228 provided by the power source 124 at the power node 226. In some cases, the peak of the input voltage 212 can be approximately twice the DC supply voltage 228. In general, the inductance L is a fixed value. In some situations, the input current 214 and the DC supply voltage 228 can vary depending on the type of power source 124 that is connected to the switch-mode power supply 130. As an example, the input current 214 can vary between two and four amperes and the DC supply voltage 228 can be greater than or equal to 4.5 volts, such as 5.25 volts. In some cases, the peak of the input voltage 212 can be between approximately 8 and 10 volts while a breakdown voltage of the switch 134 within the switching circuit 132 can be between approximately 9 and 10 V.

The switching circuit 132, however, can dynamically adjust the transition period (dt) based on the input current 214 and/or the DC supply voltage 228 to control the peak of the input voltage 212 during the third state. For example, the switching circuit 132 can decrease the transition period at the expense of increasing the peak of the input voltage 212 to improve efficiency in situations in which the peak of the input voltage 212 is not likely to be significantly large to damage the switching circuit 132. Alternatively, the switching circuit 132 can increase the transition period to decrease the peak of the input voltage 212 to improve reliability in situations in which the peak of the input voltage 212 would otherwise exceed a breakdown voltage associated with the switch 134. In this manner, the switching circuit 132 can adapt the transition period in real-time to manage reliability and efficiency.

The adjustment to the transition period of the switching circuit 132 can be observed at the output node 208. In particular, a slew rate of the output voltage 216 is dependent upon the transition period of the switching circuit 132. In this manner, the slew rate of the output voltage 216 changes in response to a change in the transition period. For example, increasing the transition period decreases the slew rate. Alternatively, decreasing the transition period increases the slew rate. The slew rate characterizes the rate at which the output voltage 216 changes from the input voltage 212 to the ground voltage 222 as the switching circuit 132 transitions from the first state to the second state (e.g., operates in the third state) during the transition period. In other words, the slew rate represents an amount of change in the output voltage 216 per unit of time.

The switching circuit 132 can also be in a fourth state (e.g., another transition state) while transitioning from the second state to the first state. In the fourth state, the switching circuit 132 increases the flow of the input current 214 from the input node 206 to the output node 208 and decreases the flow of the current from the ground node 210 to the output node 208. The switching circuit 132 is further described with respect to FIG. 3-1.

Figures 1, 3:
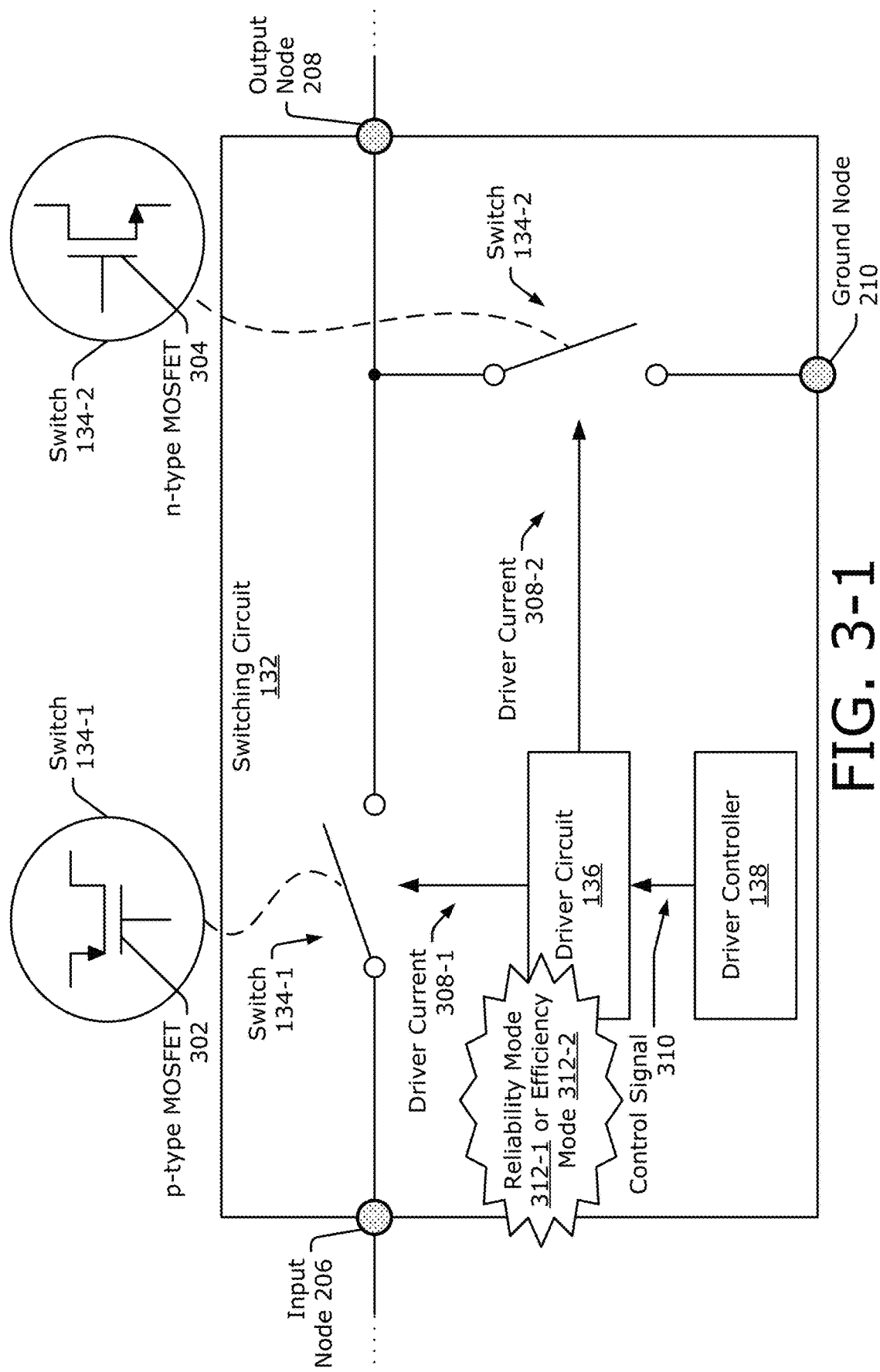
Figures 2, 3:
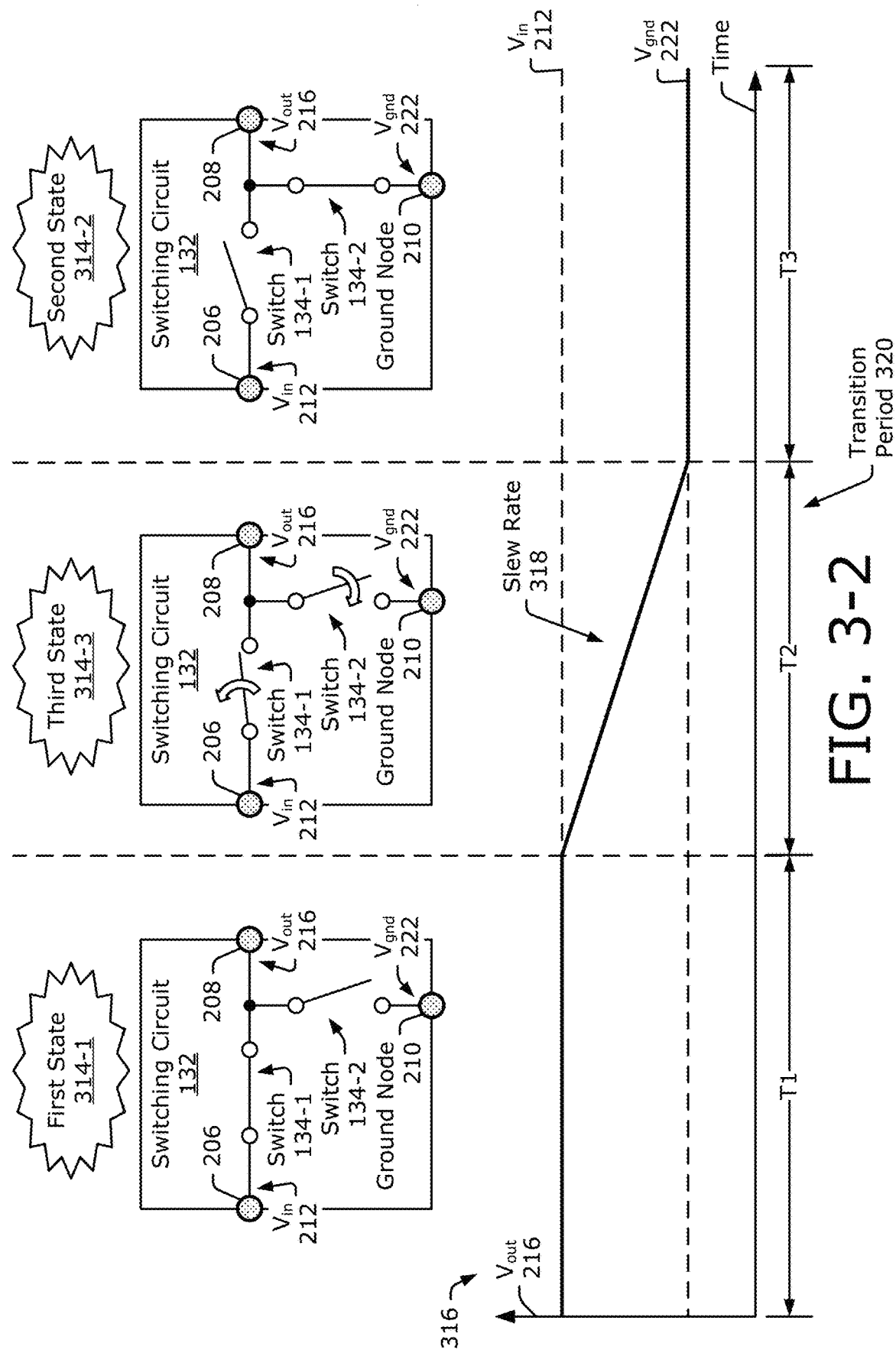
Figure 3:
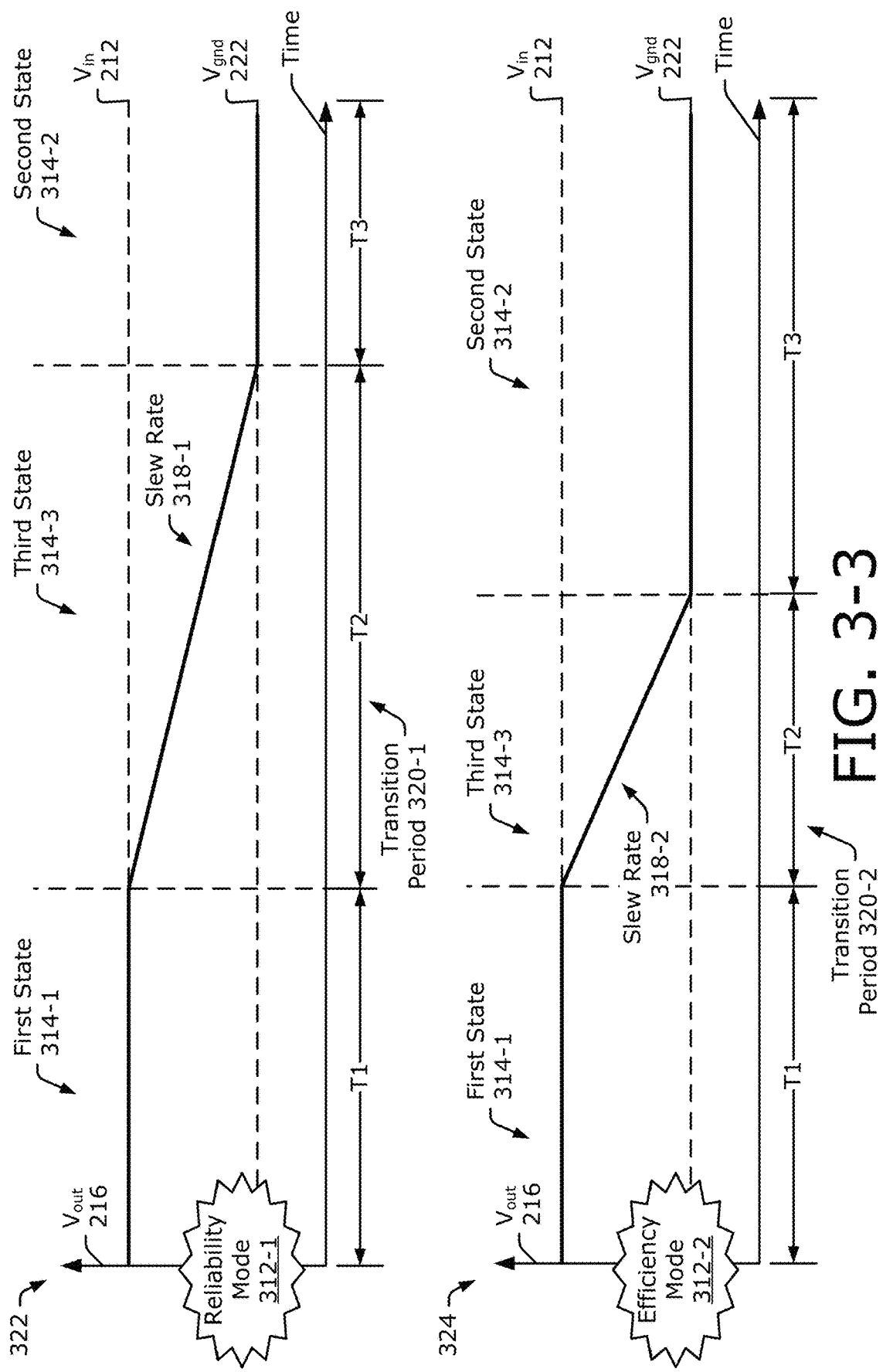

FIG. 3-1 illustrates an example switching circuit 132 for adaptive switch driving. In the depicted configuration, the switching circuit 132 includes a first switch 134-1 and a second switch 134-2. The first switch 134-1 is coupled between the input and the output of the switching circuit 132 (e.g., between the input node 206 and the output node 208). The second switch 134-2 is coupled between the ground node 210 and the output node 208. The first switch 134-1 and the second switch 134-2 enable the switch-mode power supply 130 of FIG. 2 to implement a buck converter.

In an example implementation, the switch 134-1 is implemented using a p-type MOSFET 302 and the switch 134-2 is implemented using an n-type MOSFET 304. A gate terminal of the switch 134-1 is coupled to the driver circuit 136, a source terminal of the switch 134-1 is coupled to the input node 206, and a drain terminal of the switch 134-1 is coupled to the output node 208. A gate terminal of the switch 134-2 is coupled to the driver circuit 136, a source terminal of the switch 134-2 is coupled to the ground node 210, and a drain terminal of the switch 134-2 is coupled to the output node 208.

The driver circuit 136 provides respective driver currents 308-1 and 308-2 to the switches 134-1 and 134-2. The driver circuit 136 has a variable strength, which means it can vary magnitudes of the driver currents 308-1 and 308-2. For example, the driver circuit 136 can include a first set of parallel branches with respective buffers or switches coupled between a current generator and the gate of the switch 134-1. Likewise, the driver circuit 136 can include a second set of parallel branches with respective buffers or switches coupled between the current generator and the gate of the switch 134-2. The current generator can be internal to the driver circuit 136 or external from the driver circuit 136. By enabling different quantities of the buffers within the parallel branches, the strength of the driver circuit 136 can be adjusted.

As an example, consider that the driver circuit 136 can selectively have a first strength associated with a reliability mode 312-1 or a second strength associated with an efficiency mode 312-2. In this case, the first strength is less than the second strength in order to increase the transition period and improve reliability by decreasing the peak of the input voltage 212. In contrast, the second strength is greater than the first strength to decrease the transition period and increase efficiency at the expense of increasing the peak of the input voltage 212.

Although not shown, the gates of the switches 134-1 and 134-2 can also be coupled to a voltage generator, which can be included as part of the driver circuit 136 or as part of the power transfer circuit 128. The voltage generator provides a bias voltage at the gates of the switches 134-1 and 134-2 to enable the switches 134-1 and 134-2 to operate in the open state or the closed state.

The driver controller 138 generates a control signal 310, which adjusts the strength or operational mode of the driver circuit 136. Using the control signal 310, the driver controller 138 controls the magnitude of the driver currents 308-1 and 308-2. In this way, the driver controller 138 controls the transition periods of the switches 134-1 and 134-2. As described above, the driver controller 138 adjusts the driver currents 308-1 and 308-2 based on information regarding the input current 214 and the DC supply voltage 228.

The control signal 310 can be a binary signal that indicates whether or not the driver circuit 136 operates at according to the reliability mode 312-1 or the efficiency mode 312-2. In other situations, the control signal 310 can include multiple bits to specify the quantity of buffers that are enabled within the driver circuit 136, which affects the magnitude of the driver currents 308-1 and 308-2.

In some cases, the driver controller 138 can cause the driver circuit 136 to have a same strength to open and close the switch 134-1 or 134-2. In other implementations, the driver controller 138 can cause the driver circuit 136 to operate at different strengths to open and close the switch 134-1 or 134-2. For example, the driver circuit 136's strength can be decreased to enable the switch 134-1 to safely transition from the closed state to the open state and the driver circuit 136's strength can be increased to enable the switch 134 to efficiently transition from the open state to the closed state. The driver controller 138 can include a variety of different types of monitoring circuits, as further described with respect to FIG. 4. The driver controller 138 can cause the switching circuit 132 to selectively be in one of a variety of different states, which are further described with respect to FIG. 3-2.

FIG. 3-2 illustrates example states of the switching circuit 132 for adaptive switch driving. In particular, the switching circuit 132 can selectively be in a first state 314-1, a second state 314-2, a third state 314-3, or a fourth state 314-4 (shown in FIG. 3-4). In the first state 314-1, the switch 134-1 is in a closed state and the switch 134-2 is in an open state. As such, the switching circuit 132 connects the input node 206 to the output node 208 using the switch 134-1 and disconnects the output node 208 from the ground node 210 using the switch 134-2.

In the second state 314-2, the switch 134-1 is in the open state and the switch 134-2 is in the closed state. As such, the switching circuit 132 disconnects the input node 206 from the output node 208 using the switch 134-1 and connects the output node 208 to the ground node 210 using the switch 134-2.

In the third state 314-3, the switching circuit 132 is in the process of transitioning from the first state 314-1 to the second state 314-2. In particular, the switch 134-1 is transitioning from the closed state to the open state, and the switch 134-2 is transitioning from the open state to the closed state. As such, the switching circuit 132 partially connects the input node 206 to the output node 208 using the switch 134-1 and partially connects the ground node 210 to the output node 208 using the switch 134-2. Although not illustrated in FIG. 3-2, the switching circuit 132 can also selectively be in a fourth state, which is further described with respect to FIG. 3-4.

A graph 316 illustrates the impact of the different states 314-1 to 314-3 of the switching circuit 132 on the output voltage 216. During time interval T1, the first state 314-1 causes the output voltage 216 to be approximately equal to the input voltage 212. During time interval T2, the third state 314-3 causes the output voltage 216 to decrease from an amount that is approximately equal to the input voltage 212 to another amount that is approximately equal to the ground voltage 222. The rate at which the output voltage 216 changes is referred to as a slew rate 318. The slew rate 318 is equal to a ratio of a difference between the input voltage 212 and the ground voltage 222 and a duration of the time interval T2. The time interval T2 represents a transition period 320 of the switching circuit 132. During time interval T3, the second state 314-2 causes the output voltage 216 to be approximately equal to the ground voltage 222. The slew rate 318 and the transition period 320 can vary depending on the operational mode of the driver circuit 136, as further described with respect to FIG. 3-3.

FIG. 3-3 illustrates examples graphs 322 and 324, which show changes in the output voltage 216 of the switching circuit 132 for different modes associated with adaptive switch driving. The graphs 322 and 324 illustrate changes in the output voltage 216 over time in accordance with the reliability mode 312-1 and the efficiency mode 312-2, respectively. The graphs 322 and 324 are similar to the graph 316 of FIG. 3-2. In particular, the switching circuit 132 operates in a first state 314-1 during the time interval T1, operates in a third state 314-3 during the time interval T2, and operates in a second state 314-2 during the time interval T3.

The reliability mode 312-1 and the efficiency mode 312-2 differ in terms of transition periods 320-1 and 320-2 and slew rates 318-1 and 318-2 observed during the time interval T2 while the switching circuit 132 is in the third state 314-3. For example, the reliability mode 312-1 has a longer transition period 320-1 than the transition period 320-2 of the efficiency mode 312-2. As a result, an absolute value of the slew rate 318-1 is smaller than an absolute value of the slew rate 318-2. This causes the slope of the output voltage 216 to be less steep during the reliability mode 312-1 and steeper during the efficiency mode 312-2.

By having a longer transition period 320-1 and a smaller slew rate 318-1, the reliability mode 312-1 can improve reliability of the switching circuit 132 by reducing voltage peaks caused by the third state 314-3. In contrast, the efficiency mode 312-2 improves an efficiency of the switching circuit 132 relative to the reliability mode 312-1 by having a shorter transition period 320-2 and a larger slew rate 318-2, which enables a faster transition from the first state 314-1 to the second state 314-2 relative to the reliability mode 312-1. A driver controller 138 controls whether the switching circuit 132 operates in the reliability mode 312-1 or the efficiency mode 312-2, as further described with respect to FIGS. 4 to 5-4.

Figures 3, 4:
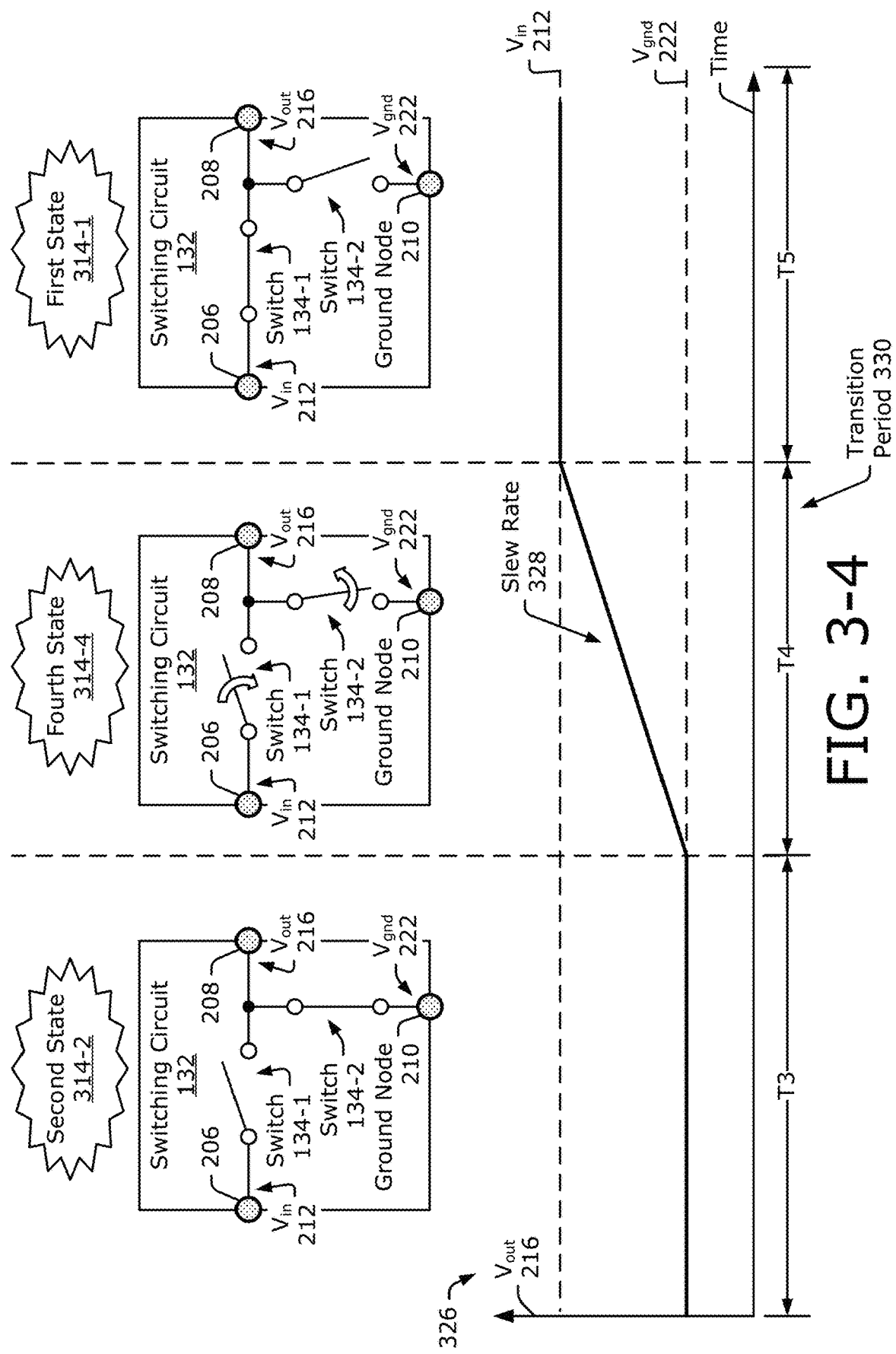
Figure 4:
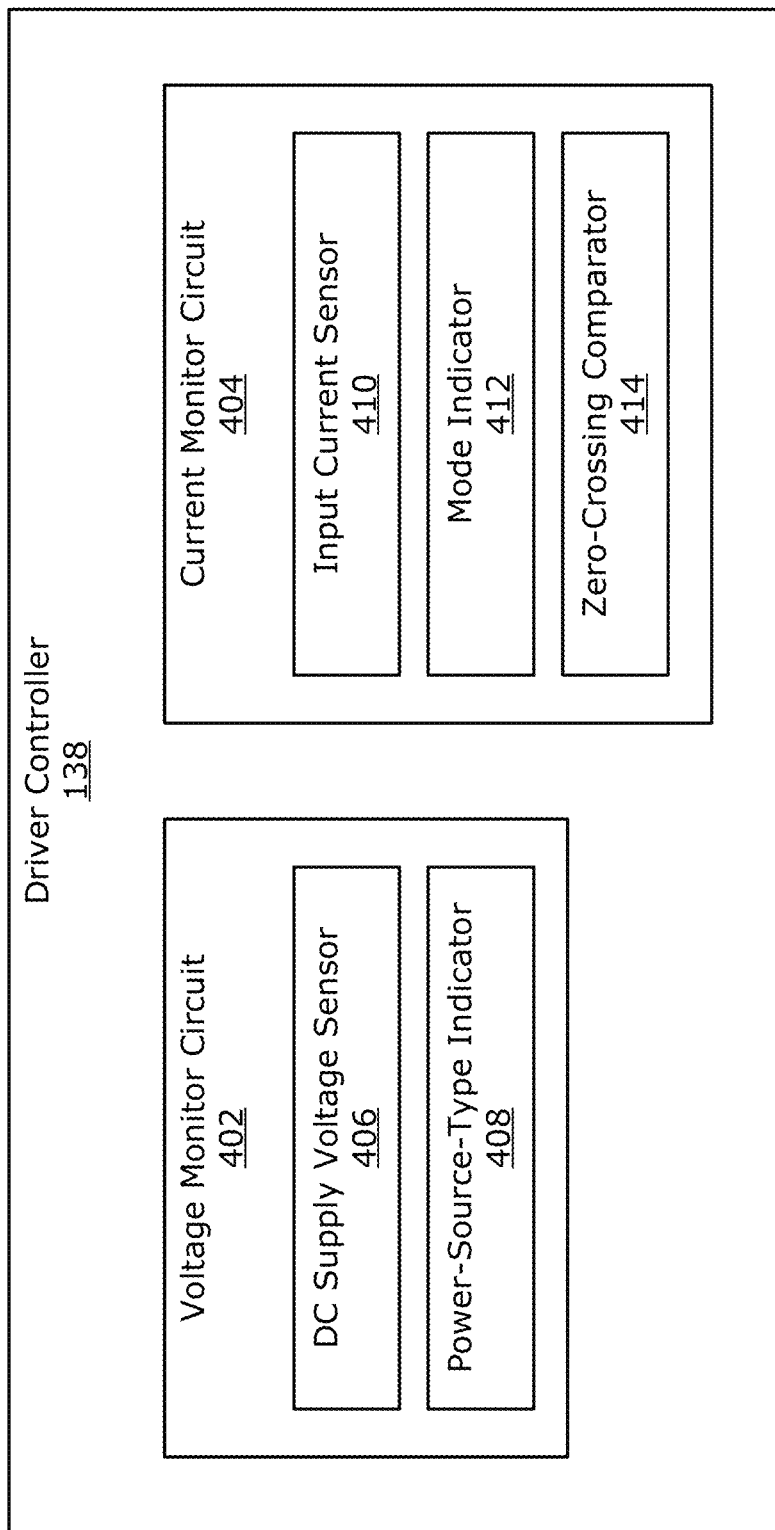

FIG. 3-4 illustrates an example fourth state 314-4 of the switching circuit 132 for adaptive switch driving. In the fourth state, the switching circuit 132 is in the process of transitioning from the second state 314-2 to the first state 314-1. In particular, the switch 134-1 is transitioning from the open state to the closed state, and the switch 134-2 is transitioning from the closed state to the open state. As such, the switching circuit 132 partially connects the input node 206 to the output node 208 using the switch 134-1 and partially connects the ground node 210 to the output node 208 using the switch 134-2.

A graph 326 illustrates the impact of the different states 314-1, 314-2, and 314-4 of the switching circuit 132 on the output voltage 216. During time interval T3, the second state 314-2 causes the output voltage 216 to be approximately equal to the ground voltage 222. The time interval T3 of FIG. 3-4 can represent the time interval T3 of in FIG. 3-2.

During time interval T4, the fourth state 314-4 causes the output voltage 216 to increase from an amount that is approximately equal to the ground voltage 222 to another amount that is approximately equal to the input voltage 212. The rate at which the output voltage 216 changes is referred to as a slew rate 328. The slew rate 328 is equal to a ratio of a difference between the input voltage 212 and the ground voltage 222 and a duration of the time interval T4. The time interval T4 represents a transition period 330 of the switching circuit 132. During time interval T5, the first state 314-1 causes the output voltage 216 to be approximately equal to the input voltage 212.

In some implementations, a magnitude of the slew rate 328 of FIG. 3-4 can be similar to a magnitude of the slew rate 318 of FIG. 3-2. In other implementations, a magnitude of the slew rate 328 of FIG. 3-4 can differ from a magnitude of the slew rate 318 of FIG. 3-2. Likewise, the transition period 330 of FIG. 3-4 can be similar to or different than the transition period 320 of FIG. 3-2.

FIG. 4 illustrates an example driver controller 138 for adaptive switch driving. In the depicted example, the driver controller 138 can include at least one voltage monitor circuit 402 and/or at least one current monitor circuit 404. The voltage monitor circuit 402 indirectly or directly determines information regarding the DC supply voltage 228 (e.g., indirectly or directly measures the DC supply voltage 228). In contrast, the current monitor circuit 404 indirectly or directly determines information regarding the input current 214 (e.g., indirectly or directly measures the input current 214).

The voltage monitor circuit 402 can include at least one a supply voltage sensor 406 and/or at least one power-source-type indicator 408. The supply voltage sensor 406 directly measures the DC supply voltage 228. The powersource-type indicator 408 provides an indication regarding the type of power source 124 that supplies the DC supply voltage 228 to the switch-mode power supply 130. This can include a generic classification of whether the power source 124 is external from the computing device 102 (e.g., a universal serial bus (USB) charger, an external solar panel, an external battery bank) or internal to the computing device 102 (e.g., an internal battery).

In some cases, the power-source-type indicator 408 can further specify the type of power source 124 that is coupled to the switch-mode power supply 130. In general, different types of power sources 124 can provide different DC supply voltages 228 or different input current 214. Therefore, the driver controller 138 can assume a particular amount or range of the DC supply voltage 228 or the input current 214 based on the type of power source 124 identified by the power-source-type indicator 408. For example, the driver controller 138 can indirectly determine that the DC supply voltage 228 is greater than approximately four volts responsive to the power-source-type indicator 408 indicating that the power source 124 comprises the USB charger. In some cases, the power-source-type indicator 408 obtains information about the power source 124 from the power transfer circuit 128.

The current monitor circuit 404 can include at least one direct input current sensor 410, at least one mode indicator 412, at least one zero-crossing comparator 414, or some combination thereof. The direct input current sensor 410 directly measures the input current 214. The mode indicator 412 indirectly determines information regarding the input current 214 based on an operating mode of the switch-mode power supply 130. As an example, the operating mode can be a pulse-width modulation mode or a skip mode. In the pulse-width modulation mode, the switching circuit 132 cycles between the first state 314-1 and the second state 314-2 according to a duty cycle, which can be varied to regulate the output voltage 216. In the skip mode, the switching circuit 132 remains in the second state 314-2 and does not transition to the first state 314-1 during one or more cycles. The zero-crossing comparator 414 analyzes zero-crossings of the output current 218 to estimate a magnitude of the input current 214. Example implementations of the driver controller 138 are further described with respect to FIGS. 5-1 to 5-4.

Figures 1, 5:
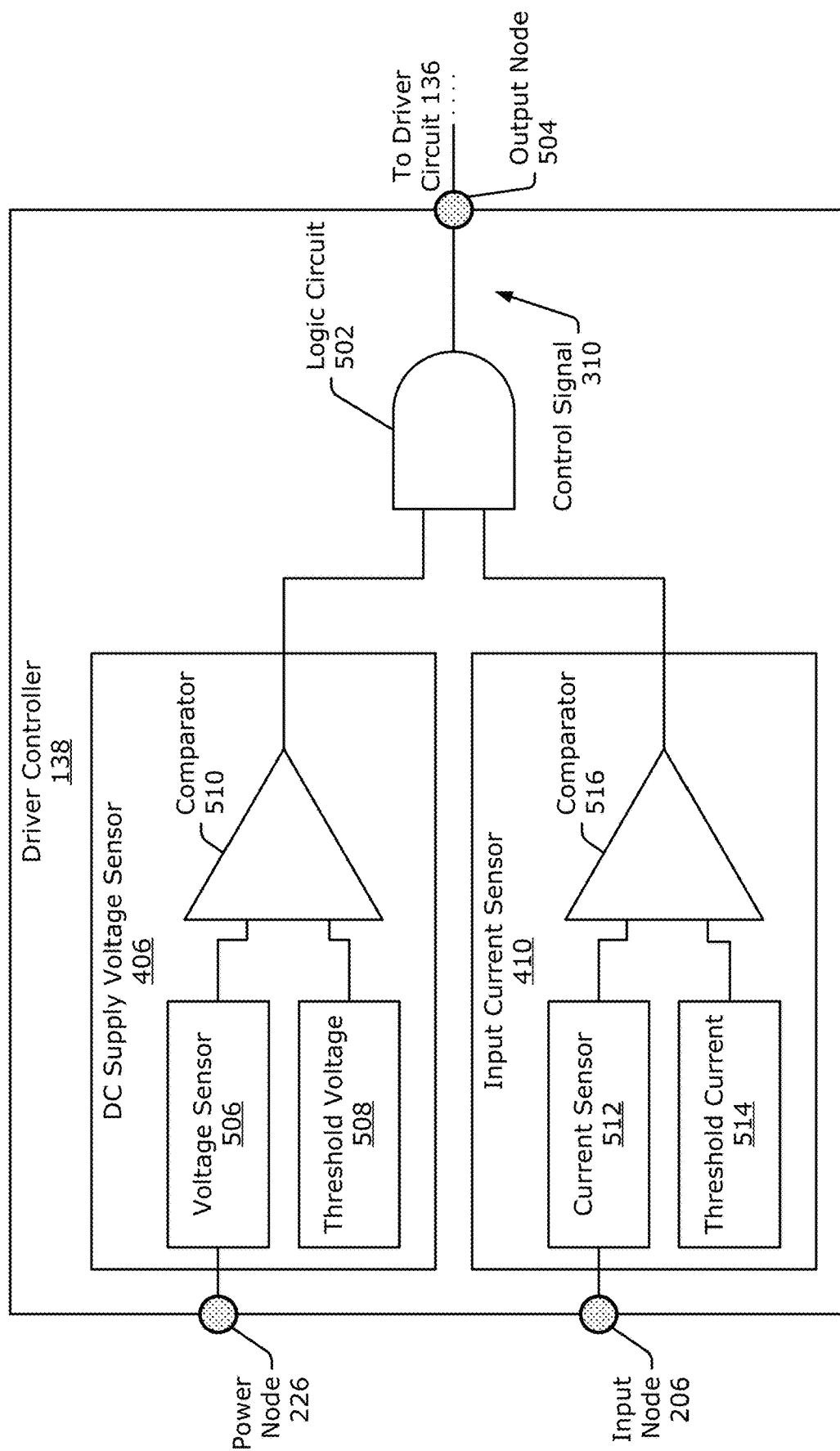
Figures 2, 5:
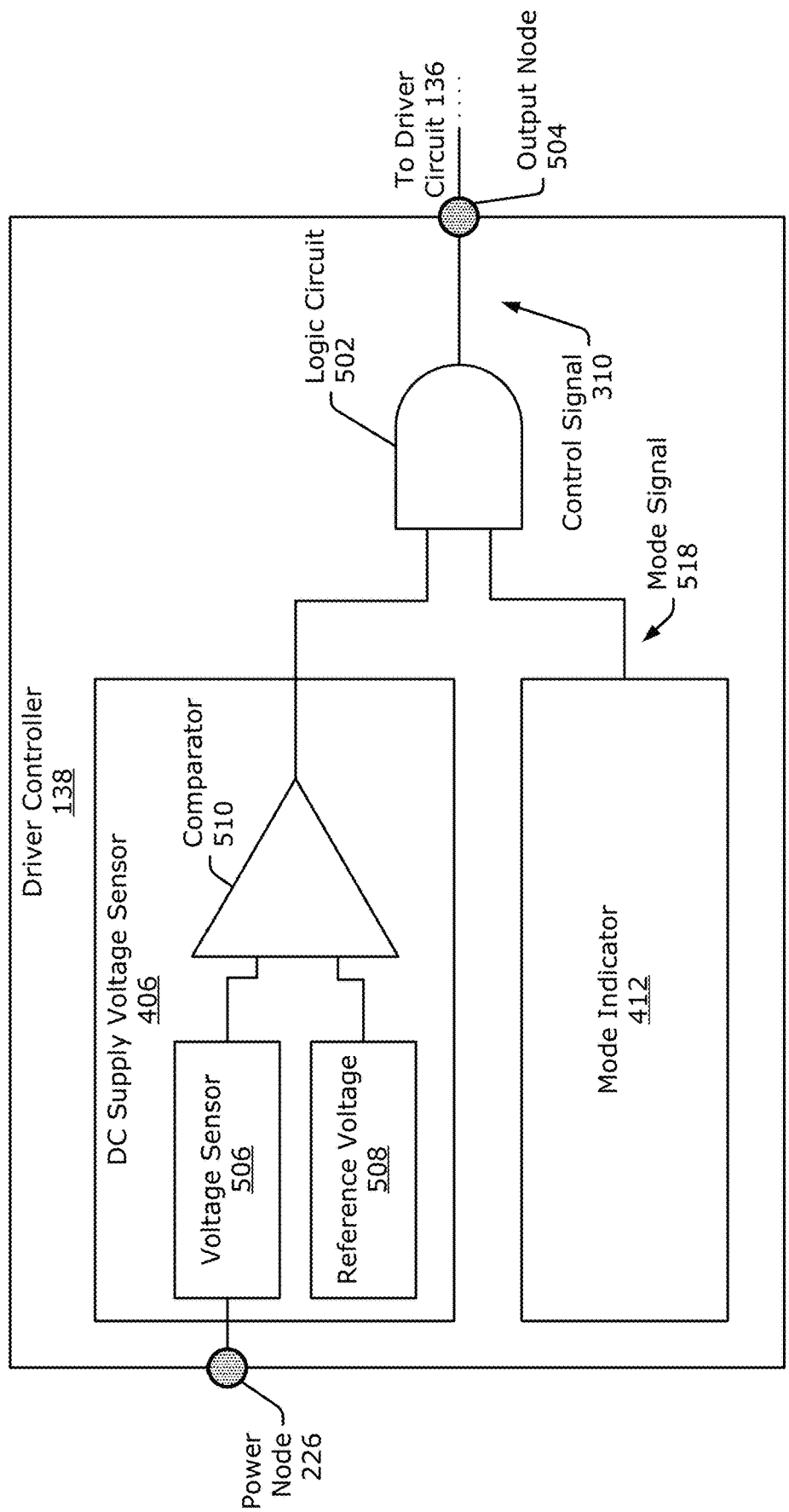
Figures 3, 5:
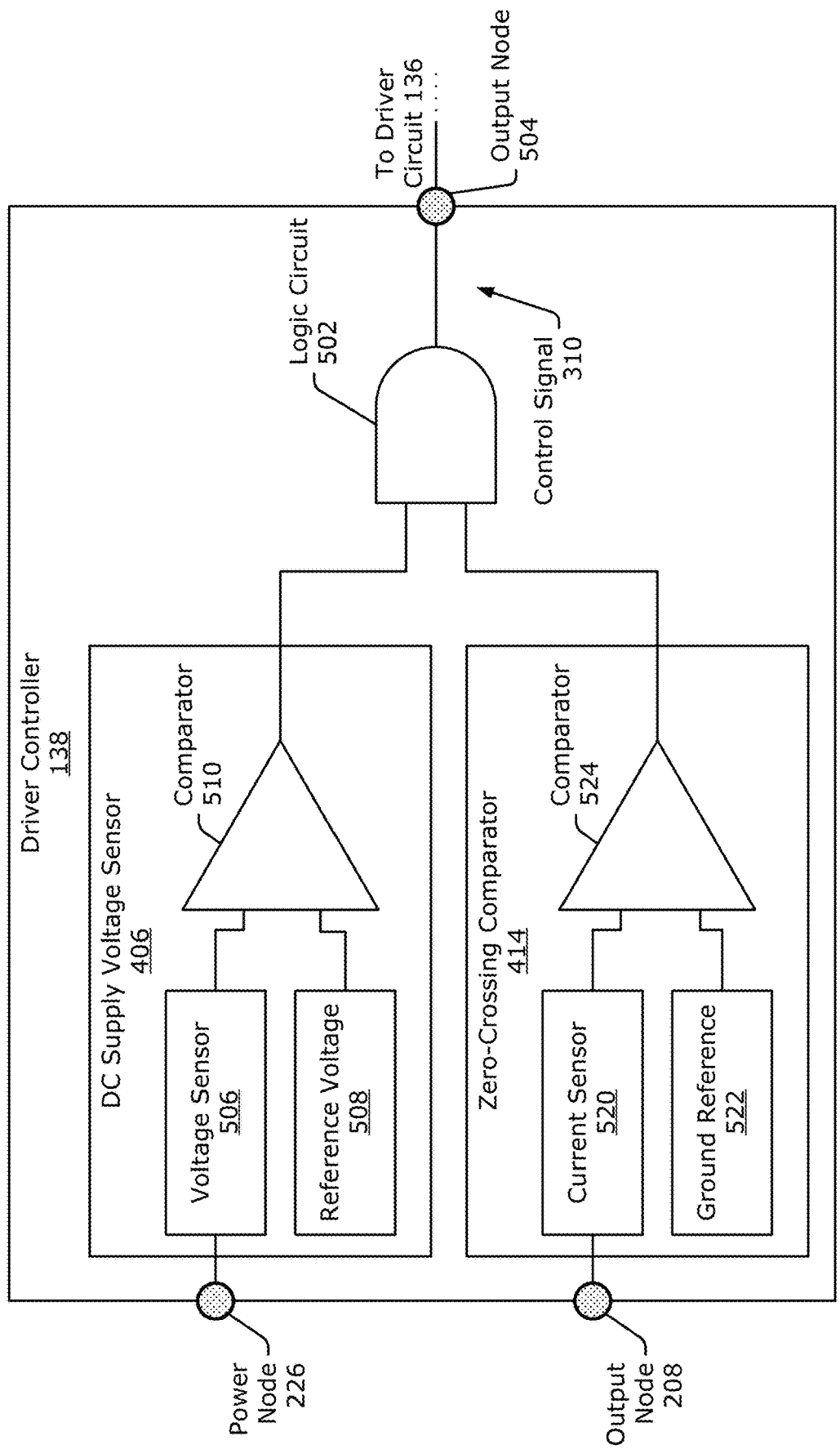
Figures 4, 5:
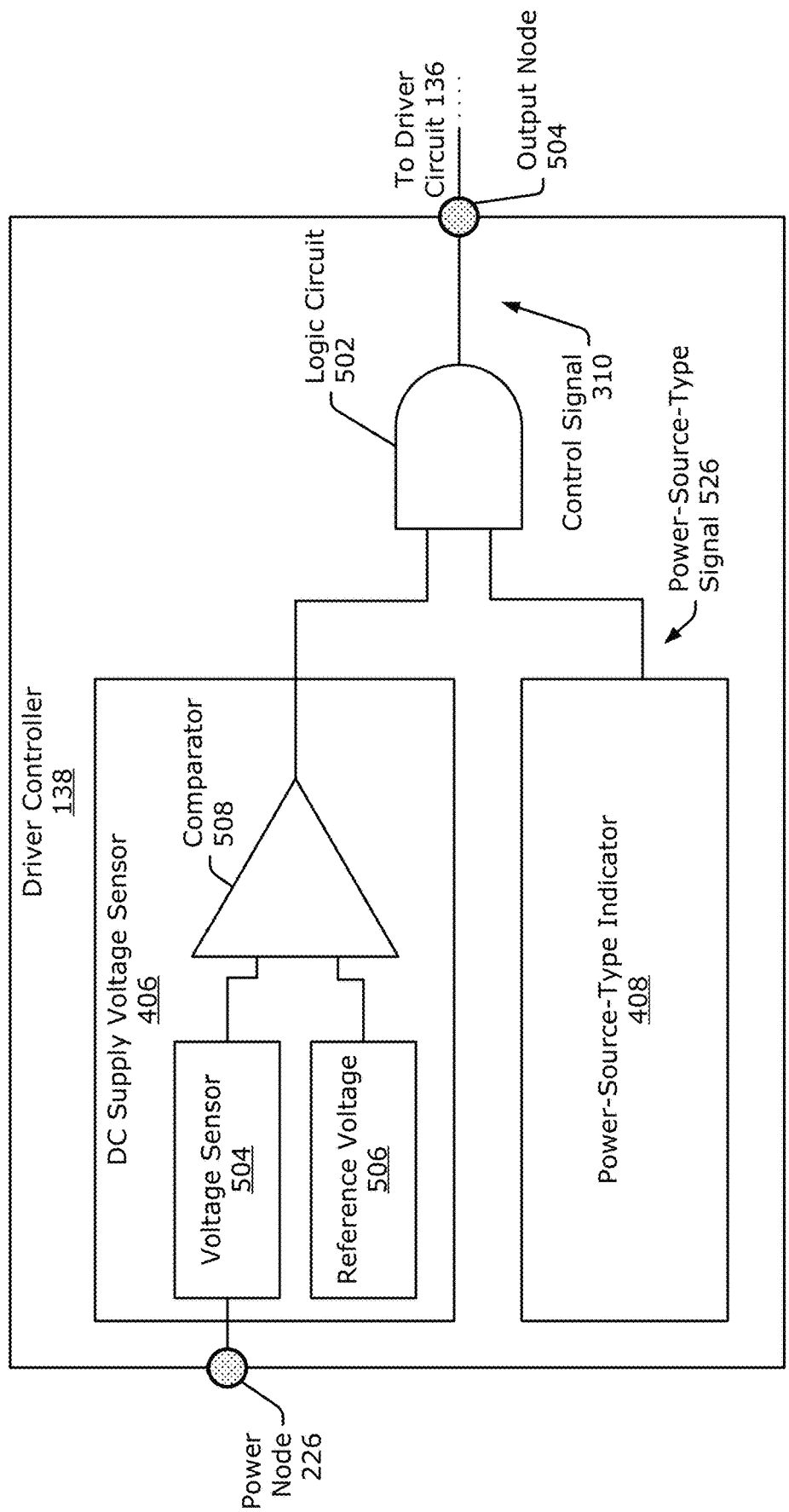

FIG. 5-1 illustrates a first example implementation of the driver controller 138 for adaptive switch driving. In the depicted configuration, the driver controller 138 includes the DC supply voltage sensor 406, the input current sensor 410, a logic circuit 502, and an output node 504. The DC supply voltage sensor 406 is coupled between the power node 226 (of FIG. 2) and the logic circuit 502. The input current sensor 410 is coupled between the input node 206 and the logic circuit 502. The logic circuit 502 is coupled to an output of the DC supply voltage sensor 406, an output of the input current sensor 410, and the output node 504. The logic circuit 502 can be implemented using one or more logic gates, such as an AND gate, an OR gate, a NAND gate, or a NOR gate. In the depicted configuration, the logic circuit 502 is implemented using an AND gate. The output node 504 is coupled to the driver circuit 136 of FIG. 1.

The DC supply voltage sensor 406 includes a voltage sensor 506, a threshold voltage 508, and a comparator 510. The voltage sensor 506 is coupled between the power node 226 and an input of the comparator 510. The threshold voltage 508 is provided to another input of the comparator 510 and can be generated by the power transfer circuit 128. As an example, the threshold voltage 508 can be approximately equal to four volts.

The input current sensor 410 includes a current sensor 512, a reference current 514, and a comparator 516. The current sensor 512 is coupled between the input node 206 and an input of the comparator 516. The reference current 514 is provided to another input of the comparator 510 and can be generated by the power transfer circuit 128. As an example, the reference current can be approximately equal to one ampere.

During operation, the DC supply voltage sensor 406 senses the DC supply voltage 228 at the power node 226 and compares the DC supply voltage 228 to the threshold voltage 508. The comparator 510 generates a first voltage to indicate that the DC supply voltage 228 is greater than the threshold voltage 508 or generates a second voltage to indicate that the DC supply voltage 228 is less than or equal to the threshold voltage 508. The input current sensor 410 senses the input current 214 at the input node 206 and compares the measured input current 214 to the threshold current 514. The comparator 516 generates the first voltage to indicate that the input current 214 is greater than the threshold current 514 or generates the second voltage to indicate that the input current 214 is less than or equal to the threshold current 514.

The logic circuit 502 generates the control signal 310 (of FIG. 3-1) based on the voltages provided by the DC supply voltage sensor 406 and the input current sensor 410. In this example, the logic circuit 502 generates the control signal 310 to decrease the strength of the driver circuit 136 (e.g., cause the driver circuit 136 to operate according to the reliability mode 312-1) responsive to the DC supply voltage 228 being greater than the threshold voltage 508 and the input current 214 being greater than the threshold current. Alternatively, the logic circuit 502 generates the control signal 310 to increase the strength of the driver circuit 136 (e.g., cause the driver circuit 136 to operate according to the efficiency mode 312-2) responsive to either the DC supply voltage 228 being less than or equal to the threshold voltage 508 or the input current 214 being less than or equal to the threshold current 514.

In this example implementation, the driver controller 138 has direct measurements regarding the DC supply voltage 228 and the input current 214. As such, the driver controller 138 can perform additional steps to specify an optimal amount of the driver current 308-1 to limit the peak of the input voltage 212 below the breakdown voltage of the switch 134-1 according to Equation 2. While this can be advantageous to enable finer control of the driver current 308-1, this implementation can be more expensive and have a larger footprint. In an alternative implementations, cost, size, and/or complexity can be reduced by replacing the input current sensor 410 with the mode indicator 412 (shown in FIG. 5-2), the zero-crossing comparator 414 (shown in FIG. 5-3), or the power-source-type indicator 408 (shown in FIG. 5-4).

FIG. 5-2 illustrates a second example implementation of the driver controller 138 for adaptive switch driving. In the depicted configuration, the driver controller 138 includes the DC supply voltage sensor 406 (of FIG. 5-1) and the logic circuit 502 (of FIG. 5-1). Instead of the input current sensor 410 of FIG. 5-1, the driver controller 138 of FIG. 5-2 includes the mode indicator 412 (of FIG. 4).

The mode indicator 412 is coupled to the logic circuit 502. The mode indicator 412 provides a mode signal 518 to the logic circuit 502. The mode signal 518 indicates whether the switch-mode power supply 130 entered the pulse-width modulation mode (e.g., transitioned from the skip mode to the pulse-width modulation mode). Generally, this transition happens if the input current 214 exceeds a threshold current, which can be between approximately 600 and 900 milliamperes. In this way, the mode signal 518 provides an indirect estimate of the input current 214. In some cases, the mode signal 518 is generated by other components within the power transfer circuit 128 and the mode indicator 412 passes the mode signal 518 (with or without modification) to the logic circuit 502.

During operation, the logic circuit 502 generates the control signal 310 (of FIG. 3-1) based on the voltage provided by the DC supply voltage sensor 406 and the mode signal 518 provided by the mode indicator 412. In this example, the logic circuit 502 generates the control signal 310 to decrease the strength of the driver circuit 136 (e.g., cause the driver circuit 136 to operate according to the reliability mode 312-1) responsive to the DC supply voltage 228 being greater than the threshold voltage 508 and the mode signal 518 indicating that that the switch-mode power supply 130 entered the pulse-width modulation mode. Alternatively, the logic circuit 502 generates the control signal 310 to increase the strength of the driver circuit 136 (e.g., cause the driver circuit 136 to operate according to the efficiency mode 312-2) responsive to either the DC supply voltage 228 being less than or equal to the threshold voltage 508 or the mode signal 518 indicating that the switch-mode power supply 130 has not transitioned from the skip mode to the pulse-width modulation mode.

FIG. 5-3 illustrates a third example implementation of the driver controller 138 for adaptive switch driving. In the depicted configuration, the driver controller 138 includes the DC supply voltage sensor 406 (of FIG. 5-1) and the logic circuit 502 (of FIG. 5-1). Instead of the input current sensor 410 of FIG. 5-1 or the mode indicator 412 of FIG. 5-2, the driver controller 138 of FIG. 5-3 includes the zero-crossing comparator 414 (of FIG. 4). In some implementations, the zero-crossing comparator 414 is already implemented as part of the switch-mode power supply 130.

The zero-crossing comparator 414 is coupled to the logic circuit 502 and the output node 208. The zero-crossing comparator 414 includes a current sensor 520, a ground reference 522, and a comparator 524. The current sensor 520 measures the output current 218 at the output node 208. The comparator 524 determines instances at which the output current 218 crosses zero (e.g., crosses the ground reference 522). At these instances, the zero-crossing comparator 414 can indirectly determine the input current 214. For example, the zero-crossing comparator 414 can indicate that the input current 214 is estimated to be less than or equal to a particular threshold amount.

During operation, the logic circuit 502 generates the control signal 310 (of FIG. 3-1) based on the voltages provided by the DC supply voltage sensor 406 and the zero-crossing comparator 414. In this example, the logic circuit 502 generates the control signal 310 to decrease the strength of the driver circuit 136 (e.g., cause the driver circuit 136 to operate according to the reliability mode 312-1) responsive to the DC supply voltage 228 being greater than the threshold voltage 508 and the estimated input current 214 being greater than the threshold amount. Alternatively, the logic circuit 502 generates the control signal 310 to increase the strength of the driver circuit 136 (e.g., cause the driver circuit 136 to operate according to the efficiency mode 312-2) responsive to either the DC supply voltage 228 being less than or equal to the threshold voltage 508 or the estimated input current 214 being less than or equal to the threshold amount.

FIG. 5-4 illustrates a fourth example implementation of the driver controller 138 for adaptive switch driving. In the depicted configuration, the driver controller 138 includes the DC supply voltage sensor 406 (of FIG. 5-1) and the logic circuit 502 (of FIG. 5-1). Instead of the input current sensor 410 of FIG. 5-1, the mode indicator 412 of FIG. 5-2, or the zero-crossing comparator 414 of FIG. 5-3, the driver controller 138 of FIG. 5-4 includes the power-source-type indicator 408 (of FIG. 4).

The power-source-type indicator 408 is coupled to the logic circuit 502. The power-source-type indicator 408 provides a power-source-type signal 526 to the logic circuit 502. The power-source-type signal 526 indicates a type or classification associated with the power source 124. In some cases, the power-source-type signal 526 is generated by other components within the power transfer circuit 128 or the computing device 102, and the power-source-type indicator 408 passes the power-source-type signal 526 to the logic circuit 502.

During operation, the logic circuit 502 generates the control signal 310 (of FIG. 3-1) based on the voltage provided by the DC supply voltage sensor 406 and the power-source-type signal 526 provided by the power-source-type indicator 408. In this example, the logic circuit 502 generates the control signal 310 to decrease the strength of the driver circuit 136 (e.g., cause the driver circuit 136 to operate according to the reliability mode 312-1) responsive to the DC supply voltage 228 being greater than the threshold voltage 508 and the power-source-type signal 526 indicating that that the power source 124 is associated with a type of power source 124 that is external from the computing device 102, such as the USB charger. Alternatively, the logic circuit 502 generates the control signal 310 to increase the strength of the driver circuit 136 (e.g., cause the driver circuit 136 to operate according to the efficiency mode 312-2) responsive to either the DC supply voltage 228 being less than or equal to the threshold voltage 508 or the power-source-type signal 526 indicating that the power source 124 is internal to the computing device 102, such as a battery of the computing device 102.

Figure 6:
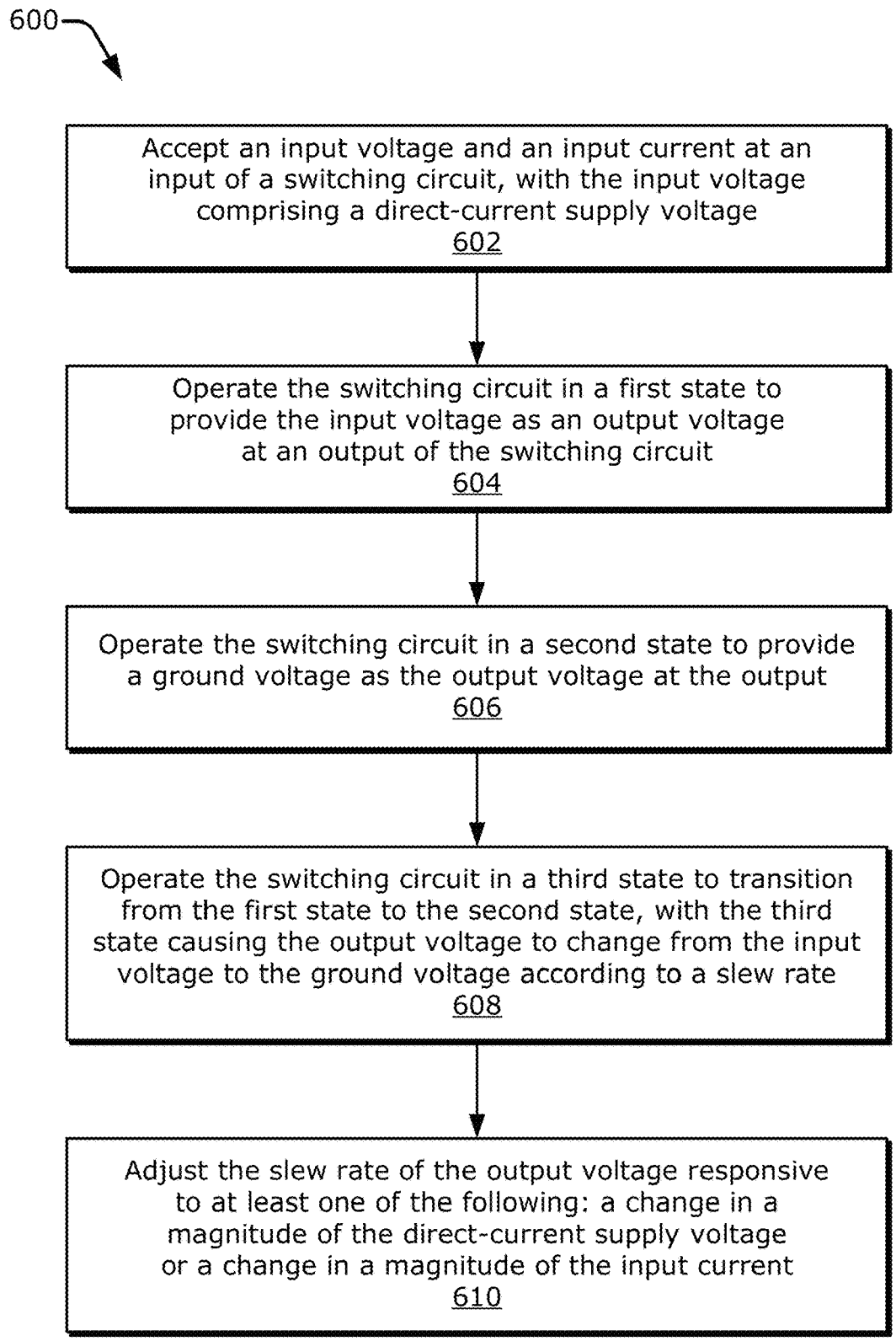
FIG. 6 illustrates a flow diagram illustrating an example process for adaptive switch driving.

FIG. 6 is a flow diagram illustrating an example process 600 for adaptive switch driving. The process 600 is described in the form of a set of blocks 602-610 that specify operations that can be performed. However, operations are not necessarily limited to the order shown in FIG. 6 or described herein, for the operations may be implemented in alternative orders or in fully or partially overlapping manners. Also, more, fewer, and/or different operations may be implemented to perform the process 600, or an alternative process. Operations represented by the illustrated blocks of the process 600 may be performed by a switch-mode power supply 130 (e.g., of FIG. 1 or 2). More specifically, the operations of the process 600 may be performed by a switching circuit 132 as shown in FIGS. 1 to 3-1.

At block 602, an input voltage and an input current are accepted at an input of a switching circuit. The input voltage comprises a direct-current supply voltage. For example, the switching circuit 132 can accept the input voltage 212 and the input current 214 at the input of thereof (e.g., at the input node 206), as shown in FIG. 2. The input voltage 212 can be a direct-current supply voltage. Thus, the power source 124 may provide the input voltage 212 and the input current 214 to the input node 206 of the switching circuit 132.

At block 604, the switching circuit operates in a first state to provide the input voltage as an output voltage at an output of the switching circuit. For example, the switching circuit 132 can operate in the first state 314-1 to provide the input voltage 212 as the output voltage 216 at the output of the switch circuit 132 (e.g., the output node 208), as shown in FIG. 3-2. The first state 314-1 may cause the switch 134-1 to be in a closed state, which connects the input node 206 to the output node 208.

At block 606, the switching circuit operates in a second state to provide a ground voltage as the output voltage at the output. For example, the switching circuit 132 can operate in the second state 314-2 to provide the ground voltage 222 as the output voltage 216 at the output of the switching circuit (e.g., at the output node 208), as shown in FIG. 3-2. The second state 314-2 may cause the switch 134-1 to be in an open state, which disconnects the input node 206 from the output node 208.

At block 608, the switching circuit operates in a third state to transition from the first state to the second state. The third state causes the output voltage to change from the input voltage to the ground voltage according to a slew rate. For example, the switching circuit 132 can operate in the third state 314-3 to transition from the first state 314-1 to the second state 314-2, as shown in FIG. 3-2. The third state 314-3 may cause the switch 134-1 to transition from the closed state to the open state. A duration that the switching circuit 132 operates in the third state 314-3 is referred to as the transition period 320. The third state 314-3 can cause the output voltage 216 to change from the input voltage 212 to the ground voltage 222 according to the slew rate 318.

The switching circuit can also operate in a fourth state 314-4 to transition from the second state 314-2 to the first state 314-1. The fourth state 314-4 causes the output voltage 216 to change from the ground voltage 222 to the input voltage 212. The fourth state 314-4 may cause the switch 134-1 to transition from the open state to the closed state.

At block 610, the slew rate of the output voltage is adjusted responsive to at least one of the following: a change in a magnitude of the direct-current supply voltage or a change in a magnitude of the input current. For example, the switching circuit 132 can adjust the slew rate of the output voltage 216 responsive to a change in a magnitude of the direct-current supply voltage 228 (of FIG. 2) or a change in a magnitude of the input current 214 (of FIG. 2). In particular, the switching circuit 132 may decrease the slew rate 318 (e.g., increase the transition period 320) according to the reliability mode 312-1 or increase the slew rate 318 (e.g., decrease the transition period 320) according to the efficiency mode 312-2, as shown in FIG. 3-2.

As an example, the switching circuit 132 can operate according to the reliability mode 312-1 responsive to detecting an increase in the direct-current supply voltage 228 or an increase in the input current 214. In this mode, the driver circuit 136 decreases the slew rate 318 to improve reliability by decreasing the peak of the input voltage 212. Alternatively, the switching circuit 132 can operate according to the efficiency mode 312-2 responsive to detecting a decrease in the magnitude of the direct-current supply voltage 228 or a decrease in the magnitude of the input current 214. In this mode, the driver circuit 136 increases the slew rate 318 to increase efficiency of the switching circuit 132 at the expense of increasing the peak of the input voltage 212. Through adaptive switch driving, the switching circuit 132 is able to appropriately configure itself to balance reliability versus efficiency in different operating conditions.

Some aspects are described below:
Aspect 1: An apparatus comprising:
a switching circuit comprising:
an input configured to accept an input voltage and an input current, the input voltage comprising a direct-current supply voltage; and
an output configured to provide an output voltage;
the switching circuit configured to selectively:
be in a first state that provides the input voltage as the output voltage,
be in a second state that provides a ground voltage as the output voltage, or
be in a third state that causes the output voltage to change from the input voltage to the ground voltage according to a slew rate, the third state enabling the switching circuit to transition from the first state to the second state; and
the switching circuit configured to adjust the slew rate of the output voltage for the third state responsive to at least one of the following: a change in a magnitude of the direct-current supply voltage or a change in a magnitude of the input current.

Aspect 2: The apparatus of aspect 1, wherein:
the switching circuit is configured to transition between the first state and the second state according to a transition period;
the slew rate of the output voltage is dependent upon the transition period; and
the switching circuit is configured to adjust the transition period responsive to at least one of the change in the magnitude of the direct-current supply voltage or the change in the magnitude of the input current.

Aspect 3: The apparatus of aspect 1 or 2, wherein the switching circuit is configured to:
decrease the slew rate responsive to at least one of an increase in the magnitude of the direct-current supply voltage or an increase in the magnitude of the input current; and
increase the slew rate responsive to at least one of a decrease in the magnitude of the direct-current supply voltage or a decrease in the magnitude of the input current.

Aspect 4: The apparatus of aspect 3, wherein:
the switching circuit comprises a switch coupled between the input and the output; and
the switching circuit is configured to cause a peak of the input voltage at the input to be less than a breakdown voltage of the switch by decreasing the slew rate of the output voltage.

Aspect 5: The apparatus of aspect 3 or 4, wherein the switching circuit is configured to:
operate at a first efficiency responsive to decreasing the slew rate of the output voltage; and
operate at a second efficiency responsive to increasing the slew rate of the output voltage, the second efficiency being greater than the first efficiency.

Aspect 6: The apparatus of any previous aspect, further comprising:
a switch-mode power supply configured to be coupled between a power source and a load, the switch-mode power supply comprising:
the switching circuit; and
at least one inductor coupled between the output of the switching circuit and the load,
wherein the input of the switching circuit is configured to be coupled to the power source.

Aspect 7: The apparatus of aspect 6, wherein:
the load comprises at least one battery; and
the switch-mode power supply is configured to transfer power from the power source to the at least one battery.

Aspect 8: The apparatus of aspects 1-3, 6, or 7, wherein the switching circuit comprises:
a first switch coupled between the input and the output, the first switch configured to selectively:
be in a closed state according to the first state to connect the input to the output; or
be in an open state according to the second state to disconnect the input from the output; and
a second switch coupled between the output and a ground, the second switch configured to selectively:
be in the open state according to the first state to disconnect the ground from the output; or
be in the closed state according to the second state to connect the ground to the output.

Aspect 9: The apparatus of aspect 8, wherein the switching circuit comprises:
at least one driver circuit coupled to the first switch and the second switch, the at least one driver circuit configured to:
provide a first driver current to the first switch to enable the first switch to transition from the closed state to the open state; and
provide a second driver current to the second switch to enable the second switch to transition from the open state to the closed state; and
at least one driver controller coupled to the at least one driver circuit, the at least one driver controller configured to:
detect at least one of the change in the magnitude of the direct-current supply voltage or the change in the magnitude of the input current; and
adjust a magnitude of the first driver current and a magnitude of the second driver current based on the detected change to adjust the slew rate of the output voltage.

Aspect 10: An apparatus comprising:
switch-mode means for transferring power between a power source and a load, the switch-mode means comprising:
switching means for selectively operating in a closed state to connect the power source to the load or an open state to disconnect the power source from the load;
driver means for controlling a transition period associated with the switching means transitioning from the closed state to the open state;
monitor means for detecting a change in a magnitude of an input current or a change in a magnitude of a direct-current supply voltage provided by the power source; and
control means for adjusting the transition period responsive to the monitor means detecting the change in the magnitude of the input current or the change in the magnitude of the direct-current supply voltage.

Aspect 11: The apparatus of aspect 10, wherein the controls means is configured to:
increase the transition period responsive to the monitor means detecting at least one of an increase in the magnitude of the direct-current supply voltage or an increase in the magnitude of the input current; and
decrease the transition period responsive to the monitor means detecting at least one of a decrease in the magnitude of the direct-current supply voltage or a decrease in the magnitude of the input current.

Aspect 12: The apparatus of aspect 10 or 11, wherein: the control means is configured to cause a peak of an input voltage at an input of the switching means to be less than a breakdown voltage of the switching means by increasing the transition period.

Aspect 13: The apparatus of any one of aspects 10-12, wherein the switching means is configured to:
operate at a first efficiency responsive to the control means increasing the transition period; and
operate at a second efficiency responsive to the control means decreasing the transition period, the second efficiency being greater than the first efficiency.

Aspect 14: A method comprising:
accepting an input voltage and an input current at an input of a switching circuit, the input voltage comprising a direct-current supply voltage;
operating the switching circuit in a first state to provide the input voltage as an output voltage at an output of the switching circuit;
operating the switching circuit in a second state to provide a ground voltage as the output voltage at the output;
operating the switching circuit in a third state to transition from the first state to the second state, the third state causing the output voltage to change from the input voltage to the ground voltage according to a slew rate; and
adjusting the slew rate of the output voltage responsive to at least one of the following: a change in a magnitude of the direct-current supply voltage or a change in a magnitude of the input current.

Aspect 15: The method of aspect 14, wherein the adjusting of the slew rate comprises:
decreasing the slew rate responsive to at least one of an increase in the magnitude of the direct-current supply voltage or an increase in the magnitude of the input current;
and increasing the slew rate responsive to at least one of a decrease in the magnitude of the direct-current supply voltage or a decrease in the magnitude of the input current.

Aspect 16: The method of aspect 15, wherein the decreasing of the slew rate comprises causing a peak of the input voltage at the input to be less than a breakdown voltage associated with the switching circuit.

Aspect 17: The method of aspect 15 or 16, wherein:
the decreasing of the slew rate comprises operating the switching circuit at a first efficiency; and
the increasing of the slew rate comprises operating the switching circuit at a second efficiency, the second efficiency being greater than the first efficiency.

Aspect 18: An apparatus comprising:
a switching circuit comprising:
an input configured to accept an input voltage;
at least one switch coupled between the input of the switching circuit and an output of the switching circuit, the at least one switch configured to selectively:
be in a closed state to connect the input to the output; or
be in an open state to disconnect the input from the output;
at least one driver circuit coupled to the at least one switch, the at least one driver circuit configured to provide a driver current to enable the at least one switch to transition from the closed state to the open state; and at least one driver controller coupled to the at least one driver circuit, the at least one driver controller configured to:
monitor at least one parameter associated with the input voltage;
detect a change in the at least one parameter; and
adjust a magnitude of the driver current provided by the at least one driver circuit based on the detected change in the at least one parameter.

Aspect 19: The apparatus of aspect 18, wherein a transition period of the at least one switch is dependent upon the magnitude of the driver current.

Aspect 20: The apparatus of aspect 18 or 19, wherein:
the at least one parameter is configured to selectively have a first magnitude or a second magnitude that is smaller than the first magnitude;
the at least one driver circuit is configured to selectively:
provide a first driver current as the driver current; or
provide a second driver current as the driver current, the second driver current being smaller than the first driver current; and
the at least one driver controller is configured to selectively:
cause the at least one driver circuit to provide the second driver current responsive to the at least one parameter having the first magnitude; or
cause the at least one driver circuit to provide the first driver current responsive to the at least one parameter having the second magnitude.

Aspect 21: The apparatus of aspect 20, wherein:
the input is configured to accept an input current;
the input voltage comprises a direct-current supply voltage; and
the at least one parameter includes the input current and the direct-current supply voltage.

Aspect 22: The apparatus of aspect 21, wherein the driver controller comprises at least one of the following:
a voltage monitor circuit configured to measure the direct-current supply voltage indirectly or directly; and
a current monitor circuit configured to measure the input current indirectly or directly.

Aspect 23: The apparatus of aspect 22, wherein the voltage monitor circuit comprises a direct-current supply voltage sensor.

Aspect 24: The apparatus of aspect 22 or 23, wherein the voltage monitor circuit comprises a power-source-type indicator.

Aspect 25: The apparatus of any one of aspects 22-24, wherein the current monitor circuit comprises an input current sensor.

Aspect 26: The apparatus of any one of aspects 22-25, wherein the current monitor circuit comprises a mode indicator.

Aspect 27: The apparatus of any one of aspects 22-26, wherein the current monitor circuit comprises a zero-crossing comparator.

Aspect 28: The apparatus of any one of aspects 18-26, wherein the at least one driver controller is configured to:
detect an increase in a magnitude of the at least one parameter; and
responsive to the detection, cause the at least one driver circuit to decrease the driver current.

Aspect 29: The apparatus of aspect 28, wherein the at least one driver controller is configured to decrease the driver current by an amount that enables a peak of the input voltage to be less than a breakdown voltage of the at least one switch.

Aspect 30: The apparatus of any one of aspects 18-29, wherein the at least one driver controller is configured to:
detect a decrease in the magnitude of at least one parameter; and
responsive to the detection, cause the at least one driver circuit to increase the driver current.

Aspect 31: The apparatus of aspect 30, wherein the at least one driver controller is configured to increase an efficiency of the at least one switch by increasing the driver current.

Aspect 32: The apparatus of any one of aspects 18-31, further comprising a switch-mode power supply, wherein:
the switch-mode power supply comprises the switching circuit;
the at least one parameter comprises a mode signal, the mode signal indicating an operational mode of the switch-mode power supply; and
the at least one driver controller is configured to cause the at least one driver circuit to decrease the driver current responsive to the mode signal changing from indicating a skip mode to indicating a pulse-width modulation mode.

Aspect 33: The apparatus of claim any one of aspects 18-32, further comprising an internal power source, wherein:
the apparatus is configured to selectively utilize power from an external power source or the internal power source;
the at least one parameter comprises a power-source-type signal, the power-source-type signal indicating whether the apparatus utilizes power from the external power source or the internal power source; and
the at least one driver controller is configured to cause the at least one driver circuit to selectively:
decrease the driver current responsive to the power-source-type signal changing from indicating that the apparatus is utilizing the power from the internal power source to indicating that the apparatus is utilizing the power from the external power source; or
increase the driver current responsive to the power-source-type signal changing from indicating that the apparatus is utilizing the power from the external power source to indicating that the apparatus is utilizing the power from the internal power source.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:
1. An apparatus comprising:
a switching circuit comprising:
an input configured to accept an input voltage;

at least one switch coupled between the input of the switching circuit and an output of the switching circuit, the at least one switch configured to selectively:
be in a closed state to connect the input to the output; or
be in an open state to disconnect the input from the output;
at least one driver circuit coupled to the at least one, the at least one driver circuit configured to provide a driver current to enable the at least one switch to transition from the closed state to the open state; and
at least one driver controller coupled to the at least one driver circuit, the at least one driver controller configured to:
monitor at least one parameter associated with the input voltage;
detect a change in the at least one parameter; and
adjust a magnitude of the driver current provided by the at least one driver circuit based on the detected change in the at least one parameter, wherein:
the at least one parameter is configured to selectively have a first magnitude or a second magnitude that is smaller than the first magnitude;
the at least one driver circuit is configured to selectively:
provide a first driver current as the driver current; or
provide a second driver current as the driver current, the second driver current being smaller than the first driver current;
the at least one driver controller is configured to selectively:
cause the at least one driver circuit to provide the second driver current responsive to the at least one parameter having the first magnitude; or
cause the at least one driver circuit to provide the first driver current responsive to the at least one parameter having the second magnitude;
the input is configured to accept an input current;
the input voltage comprises a direct-current supply voltage; and
the at least one parameter includes the input current and the direct-current supply voltage.

2. The apparatus of claim 1, wherein a transition period of the at least one first switch is dependent upon the magnitude of the first driver current.

3. The apparatus of claim 1, further comprising a switch-mode power supply, wherein:
the switch-mode power supply comprises the switching circuit;
the at least one parameter comprises a mode signal, the mode signal indicating an operational mode of the switch-mode power supply; and
the at least one driver controller is configured to cause the at least one driver circuit to decrease the driver current responsive to the mode signal changing from indicating a skip mode to indicating a pulse-width modulation mode.

4. The apparatus of claim 1, further comprising an internal power source, wherein:
the apparatus is configured to selectively utilize power from an external power source or the internal power source;
the at least one parameter comprises a power-source-type signal, the power-source-type signal indicating whether the apparatus utilizes power from the external power source or the internal power source; and the at least one driver controller is configured to cause the at least one driver circuit to selectively:
decrease the driver current responsive to the power-source-type signal changing from indicating that the apparatus is utilizing the power from the internal power source to indicating that the apparatus is utilizing the power from the external power source; or
increase the driver current responsive to the power-source-type signal changing from indicating that the apparatus is utilizing the power from the external power source to indicating that the apparatus is utilizing the power from the internal power source.

5. The apparatus of claim 1, wherein the driver controller comprises at least one of the following:
a voltage monitor circuit configured to measure the direct-current supply voltage indirectly or directly; or
a current monitor circuit configured to measure the input current indirectly or directly.

6. The apparatus of claim 5, wherein the voltage monitor circuit comprises at least one of the following:
a direct-current supply voltage sensor; or
a power-source-type indicator.

7. The apparatus of claim 5, wherein the current monitor circuit comprises at least one of the following:
an input current sensor;
a mode indicator; or
a zero-crossing comparator.

8. The apparatus of claim 1, wherein the at least one driver controller is configured to:
detect an increase in a magnitude of the at least one parameter; and
responsive to the detection, cause the at least one driver circuit to decrease the driver current.

9. The apparatus of claim 8, wherein the at least one driver controller is configured to decrease the driver current by an amount that enables a peak of the input voltage to be less than a breakdown voltage of the at least one switch.

10. The apparatus of claim 1, wherein the at least one driver controller is configured to:
detect a decrease in a magnitude of the at least one parameter; and
responsive to the detection, cause the at least one driver circuit to increase the driver current.

11. The apparatus of claim 10, wherein the at least one driver controller is configured to increase an efficiency of the at least one switch by increasing the driver current.

12. An apparatus comprising:
a switching circuit comprising:
an input configured to accept an input voltage;
at least one switch coupled between the input of the switching circuit and an output of the switching circuit, the at least one switch configured to selectively:
be in a closed state to connect the input to the output; or
be in an open state to disconnect the input from the output;
at least one driver circuit coupled to the at least one switch, the at least one driver circuit configured to provide a driver current to enable the at least one switch to transition from the closed state to the open state; and
at least one driver controller coupled to the at least one driver circuit, the at least one driver controller configured to:

monitor at least one parameter associated with the input voltage;
detect a change in the at least one parameter; and
adjust a magnitude of the driver current provided by the at least one driver circuit based on the detected change in the at least one parameter, wherein:
the apparatus comprises a switch-mode power supply that comprises the switching circuit;
the at least one parameter comprises a mode signal, the mode signal indicating an operational mode of the switch-mode power supply; and
the at least one driver controller is configured to cause the at least one driver circuit to decrease the driver current responsive to the mode signal changing from indicating a skip mode to indicating a pulse-width modulation mode.

13. The apparatus of claim 12, wherein a transition period of the at least one switch is dependent upon the magnitude of the driver current.

14. The apparatus of claim 12, wherein:
the at least one parameter is configured to selectively have a first magnitude or a second magnitude that is smaller than the first magnitude;
the at least one driver circuit is configured to selectively:
provide a first driver current as the driver current; or
provide a second driver current as the driver current, the second driver current being smaller than the first driver current; and
the at least one driver controller is configured to selectively:
cause the at least one driver circuit to provide the second driver current responsive to the at least one parameter having the first magnitude; or
cause the at least one driver circuit to provide the first driver current responsive to the at least one parameter having the second magnitude.

15. The apparatus of claim 14, wherein:
the input is configured to accept an input current;
the input voltage comprises a direct-current supply voltage; and
the at least one parameter includes the input current and the direct-current supply voltage.

16. The apparatus of claim 15, wherein the driver controller comprises at least one of the following:
a voltage monitor circuit configured to measure the direct-current supply voltage indirectly or directly; or
a current monitor circuit configured to measure the input current indirectly or directly.

17. The apparatus of claim 16, wherein the voltage monitor circuit comprises at least one of the following:
a direct-current supply voltage sensor; or
a power-source-type indicator.

18. The apparatus of claim 16, wherein the current monitor circuit comprises at least one of the following:
an input current sensor;
a mode indicator; or
a zero-crossing comparator.

19. The apparatus of claim 12, wherein the at least one driver controller is configured to:
detect an increase in a magnitude of the at least one parameter; and
responsive to the detection, cause the at least one driver circuit to decrease the driver current.

20. The apparatus of claim 19, wherein the at least one driver controller is configured to decrease the driver current by an amount that enables a peak of the input voltage to be less than a breakdown voltage of the at least one switch.

21. The apparatus of claim 12, wherein the at least one driver controller is configured to:
detect a decrease in a magnitude of the at least one parameter; and
responsive to the detection, cause the at least one driver circuit to increase the driver current.

22. The apparatus of claim 21, wherein the at least one driver controller is configured to increase an efficiency of the at least one switch by increasing the driver current.

23. An apparatus comprising:
an internal power source; and
a switching circuit comprising:
an input configured to accept an input voltage;
at least one switch coupled between the input of the switching circuit and an output of the switching circuit, the at least one switch configured to selectively:
be in a closed state to connect the input to the output; or
be in an open state to disconnect the input from the output;
at least one driver circuit coupled to the at least one switch, the at least one driver circuit configured to provide a driver current to enable the at least one switch to transition from the closed state to the open state; and
at least one driver controller coupled to the at least one driver circuit, the at least one driver controller configured to:
monitor at least one parameter associated with the input voltage;
detect a change in the at least one parameter; and
adjust a magnitude of the driver current provided by the at least one driver circuit based on the detected change in the at least one parameter, wherein:
the apparatus is configured to selectively utilize power from an external power source or the internal power source;
the at least one parameter comprises a power-source-type signal, the power-source-type signal indicating whether the apparatus utilizes power from the external power source or the internal power source; and
the at least one driver controller is configured to cause the at least one driver circuit to selectively:
decrease the driver current responsive to the power-source-type signal changing from indicating that the apparatus is utilizing the power from the internal power source to indicating that the apparatus is utilizing the power from the external power source; or
increase the driver current responsive to the power-source-type signal changing from indicating that the apparatus is utilizing the power from the external power source to indicating that the apparatus is utilizing the power from the internal power source.

24. The apparatus of claim 23, wherein a transition period of the at least one switch is dependent upon the magnitude of the driver current.

25. The apparatus of claim 23, wherein:
the at least one parameter is configured to selectively have a first magnitude or a second magnitude that is smaller than the first magnitude;
the at least one driver circuit is configured to selectively:
provide a first driver current as the driver current; or
provide a second driver current as the driver current, the second driver current being smaller than the first driver current; and the at least one driver controller is configured to selectively:
    cause the at least one driver circuit to provide the second driver current responsive to the at least one parameter having the first magnitude; or
    cause the at least one driver circuit to provide the first driver current responsive to the at least one parameter having the second magnitude.

26. The apparatus of claim 25, wherein:
the input is configured to accept an input current;
the input voltage comprises a direct-current supply voltage; and
the at least one parameter includes the input current and the direct-current supply voltage.

27. The apparatus of claim 26, wherein the driver controller comprises at least one of the following:
    a voltage monitor circuit configured to measure the direct-current supply voltage indirectly or directly; or
    a current monitor circuit configured to measure the input current indirectly or directly.

28. The apparatus of claim 23, wherein the at least one driver controller is configured to:
    detect an increase in a magnitude of the at least one parameter; and
    responsive to the detection, cause the at least one driver circuit to decrease the driver current.

29. The apparatus of claim 28, wherein the at least one driver controller is configured to decrease the driver current by an amount that enables a peak of the input voltage to be less than a breakdown voltage of the at least one switch.

30. The apparatus of claim 23, wherein the at least one driver controller is configured to:
    detect a decrease in a magnitude of the at least one parameter; and
    responsive to the detection, cause the at least one driver circuit to increase the driver current.

* * * * *